US012578612B2

(12) United States Patent
Lee et al.

(10) Patent No.: US 12,578,612 B2
(45) Date of Patent: Mar. 17, 2026

(54) OPTICAL PATH CONTROL MEMBER AND DISPLAY DEVICE COMPRISING SAME

(71) Applicant: LG INNOTEK CO., LTD., Seoul (KR)

(72) Inventors: Jong Sik Lee, Seoul (KR); Seung Jin Kim, Seoul (KR); Jin Gyeong Park, Seoul (KR); Joon Jae Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 84 days.

(21) Appl. No.: 18/719,885

(22) PCT Filed: Nov. 23, 2022

(86) PCT No.: PCT/KR2022/018586
§ 371 (c)(1),
(2) Date: Jun. 14, 2024

(87) PCT Pub. No.: WO2023/113280
PCT Pub. Date: Jun. 22, 2023

(65) Prior Publication Data
US 2025/0044660 A1 Feb. 6, 2025

(30) Foreign Application Priority Data

Dec. 14, 2021 (KR) ........................ 10-2021-0178262
Dec. 28, 2021 (KR) ........................ 10-2021-0190227

(51) Int. Cl.
*G02F 1/1679* (2019.01)
*G02F 1/1335* (2006.01)
(Continued)

(52) U.S. Cl.
CPC ...... *G02F 1/1679* (2019.01); *G02F 1/133528* (2013.01); *G02F 1/16755* (2019.01); *G02F 1/1676* (2019.01); *G02F 1/1677* (2019.01)

(58) Field of Classification Search
CPC ............................ G02B 26/023; G02B 26/08; G02B 2207/123; G02F 1/1323; G02F 1/167;
(Continued)

(56) References Cited

U.S. PATENT DOCUMENTS

2009/0109520 A1   4/2009   Park et al.
2013/0202840 A1   8/2013   Nakamura et al.

FOREIGN PATENT DOCUMENTS

JP      2010-85566 A    4/2010
JP      2013-37190 A    2/2013
(Continued)

OTHER PUBLICATIONS

International Search Report dated Mar. 2, 2023 in International Application No. PCT/KR2022/018586.
(Continued)

*Primary Examiner* — Jia X Pan
(74) *Attorney, Agent, or Firm* — Saliwanchik, Lloyd & Eisenschenk

(57) ABSTRACT

An optical path control member according to an embodiment includes a first substrate; a first electrode disposed on the first substrate; a second substrate disposed on the first substrate; a second electrode disposed under the second substrate; a light conversion unit disposed between the first electrode and the second electrode and including a plurality of accommodating parts in which a light conversion material is disposed; and a first sealing part and a second sealing part formed in a cutting region formed by cutting the second substrate, the second electrode, and the light conversion unit, and extending in a first direction, wherein the first sealing part and the second sealing part include a sealing region disposed inside the cutting region and an anchor region disposed inside the accommodating part, respectively, and wherein a size of the anchor region of the first
(Continued)

sealing part is greater than a size of the anchor region of the second sealing part.

16 Claims, 18 Drawing Sheets

(51) Int. Cl.
  *G02F 1/16755* (2019.01)
  *G02F 1/1676* (2019.01)
  *G02F 1/1677* (2019.01)

(58) Field of Classification Search
  CPC ..... G02F 1/1679; G02F 1/1681; H10K 59/50;
                    H10K 59/8791; H10K 59/8722
  See application file for complete search history.

(56) References Cited

FOREIGN PATENT DOCUMENTS

| | | | |
|---|---|---|---|
| JP | 2013037190 A | * | 2/2013 |
| KR | 10-2011-0090480 A | | 8/2011 |
| KR | 10-1257685 B1 | | 4/2013 |
| KR | 10-2020-0012683 A | | 2/2020 |
| KR | 10-2021-0117717 A | | 9/2021 |
| KR | 10-2021-0127458 A | | 10/2021 |
| KR | 10-2021-0136603 A | | 11/2021 |

OTHER PUBLICATIONS

Office Action dated Feb. 3, 2025 in Korean Application No. 10-2021-0178262.

* cited by examiner

FIG. 8

LIGHT

⬇

110
210
410
300
420
220
120

310     320     330b 330a
330

PUBLIC MODE

FIG. 22
LIGHT
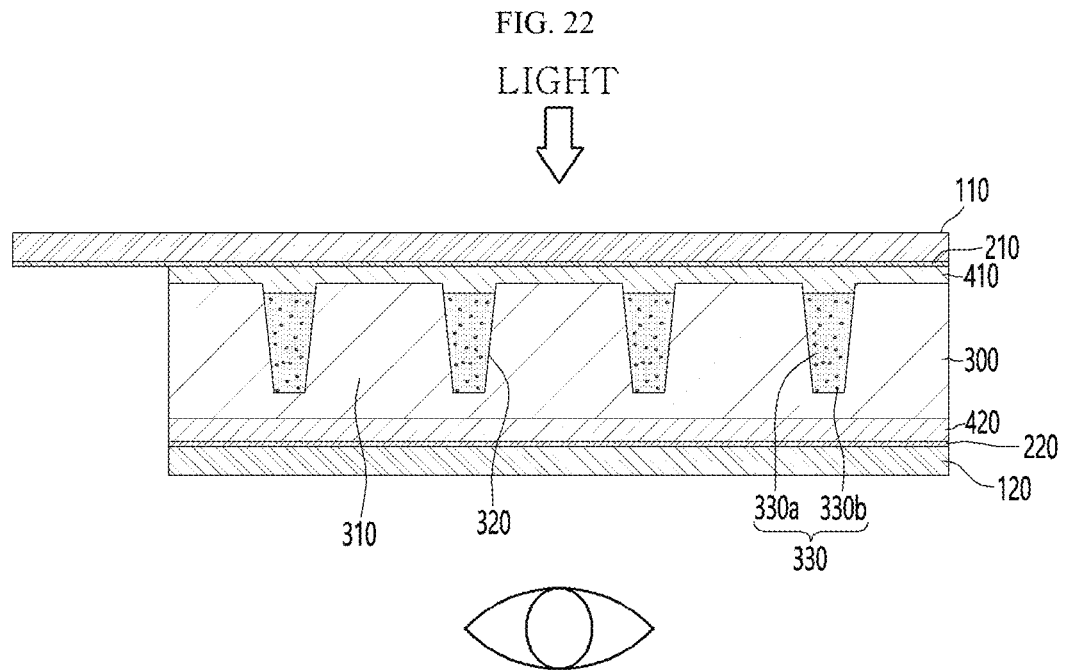
PRIVACY MODE
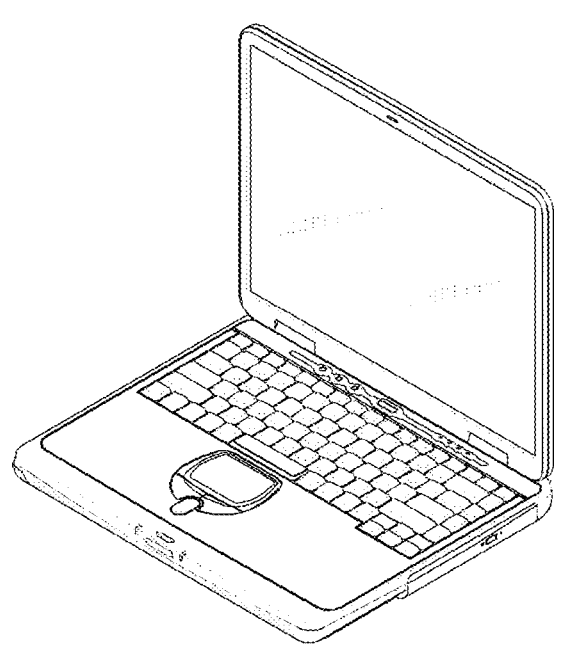

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2022/018586, filed Nov. 23, 2022, which claims the benefit under 35 U.S.C. § 119 of Korean Application Nos. 10-2021-0178262, filed Dec. 14, 2021; and 10-2021-0190227, filed Dec. 28, 2021; the disclosures of each of which are incorporated herein by reference in their entirety.

TECHNICAL FIELD

An embodiment relates to an optical path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to inhibit glare, or to inhibit the inside from being visible from the outside.

That is, the light blocking film may be an optical path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by converting a pattern portion into a light transmitting part and a light blocking part by filling the inside of the pattern portion with particles that may move when a voltage is applied and a dispersion liquid for dispersing the particles and by dispersing and aggregating the particles.

At this time, in order to apply the voltage to the optical path control member, an electrode of the optical path control member must be connected to an external power source. The viewing angle cannot be controlled at these electrode connection parts. Accordingly, the electrode connection portion may be defined as a bezel region in the display device.

Meanwhile, the optical path control member may include a cutting region formed by cutting one surface of the optical path control member. A sealing part can be formed by filling the cutting region with a sealing material. The light conversion material may be sealed by the sealing part.

However, external moisture may penetrate into the light conversion material through the sealing part. Accordingly, the user may recognize it as a stain from the outside. In addition, there is a problem in that the light conversion efficiency of the optical path control member is reduced.

Accordingly, in order to solve the above problems, an optical path control member having a new structure is required.

DISCLOSURE

Technical Problem

An embodiment provides an optical path control member with improved reliability.

Technical Solution

An optical path control member according to an embodiment includes a first substrate; a first electrode disposed on the first substrate; a second substrate disposed on the first substrate; a second electrode disposed under the second substrate; a light conversion unit disposed between the first electrode and the second electrode and including a plurality of accommodating parts in which a light conversion material is disposed; and a first sealing part and a second sealing part formed in a cutting region formed by cutting the second substrate, the second electrode, and the light conversion unit, and extending in a first direction, wherein the first sealing part and the second sealing part include a sealing region disposed inside the cutting region and an anchor region disposed inside the accommodating part, respectively, and wherein a size of the anchor region of the first sealing part is greater than a size of the anchor region of the second sealing part.

Advantageous Effects

In an optical path control member according to an embodiment, a size of the anchor region of the first sealing part is greater than a size of the anchor region of other sealing parts. That is, the size of the anchor region of the first sealing part may be greater than a size of the anchor region of at least one of the second sealing part, the third sealing part, and the fourth sealing part.

Accordingly, it is possible to inhibit moisture from penetrating into the receiving part through the first sealing part.

The first sealing part may be formed to have a relatively smaller width than other sealing parts. In addition, the first sealing part may be exposed to an outside of the optical path control member. Accordingly, the first sealing part may be more vulnerable to moisture and external impact than other sealing parts.

Accordingly, the size of the anchor region of the first sealing part disposed inside the accommodating part can be made greater than that of other sealing parts. As a result, it is possible to inhibit defects in the optical path control member due to moisture penetration.

That is, the optical path control member according to the embodiment can inhibit moisture from penetrating into the accommodating part due to the first sealing part having a larger size than the other sealing parts.

Therefore, it is possible to inhibit spots from being formed in the accommodating part.

In addition, it is possible to inhibit a light conversion material from being mixed with moisture. Thereby, denaturation of the light conversion material can be inhibited. As a result, the light conversion efficiency of the optical path control member can be inhibited from being reduced.

Accordingly, reliability and driving characteristics of the optical path control member may be improved.

DESCRIPTION OF DRAWINGS

FIG. 8 is a top view of a second substrate in which the first and second substrates of the optical path control member according to a second embodiment are laminated.

FIG. 15 is a cross-sectional view taken along a G-G' region of FIG. 14.

FIGS. 21 to 23 are views for describing one embodiment of the display device to which the optical path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below may be a switchable light blocking film that operates in public mode and light blocking mode depending on the application of power.

Figure 1:
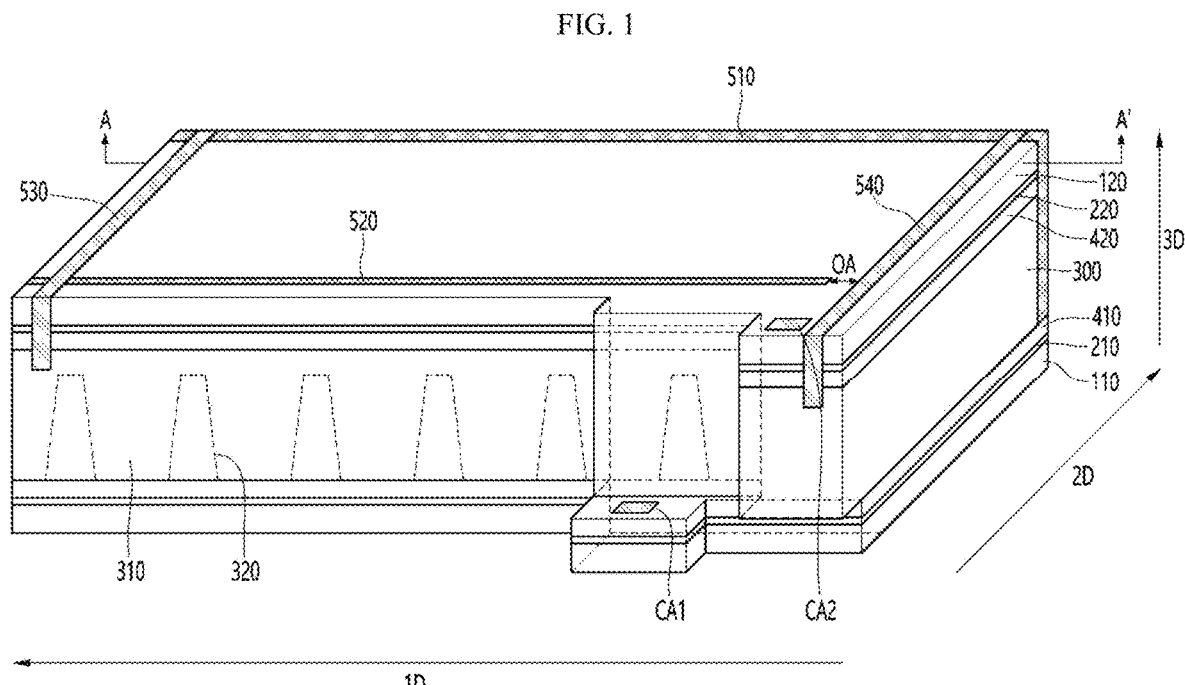
FIG. 1 is a diagram showing a perspective view of an optical path control member according to an embodiment.

FIG. 1 is a diagram showing a perspective view of an optical path control member according to an embodiment.

Referring to FIG. 1, an optical path control member 1000 according to an embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110. In addition, the first substrate 110 may include a second direction 2A extending in a direction different from the first direction 1A and corresponding to the length or width direction of the first substrate 110. In addition, the first substrate 110 may include a third direction 3A extending in a direction different from the first direction 1A and the second direction 2A and corresponding to a thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first substrate 110 may have a thickness within a set range. For example, the first substrate 110 may have a thickness of 25 μm to 150 μm.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 10 nm to 300 nm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material the same as or similar to that of the first substrate 110 described above. For example, the second substrate 120 may include the material the same as that of the first substrate 110 or a material different from that of the first substrate 110 among the materials of the first substrate 110 described above.

In addition, the second substrate 120 may have a thickness the same as or similar to that of the first substrate 110 described above. For example, the second substrate 120 may have a thickness of 25 μm to 150 μm.

In addition, the second substrate 120 may extend in the first direction 1D, second direction 2D, and third direction 3D corresponding to first substrate 110 described above. Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above. For example, the second electrode 220 may include the material the same as that of the first electrode 210 or a material different from that of the first electrode 210 among the materials of the second electrode 220 described above.

In addition, the second electrode 220 may have the same or similar thickness as the first electrode 210 described above. For example, the second electrode 220 may have a thickness of about 10 nm to about 300 nm.

In addition, the second electrode 220 may be formed to have the same or similar thickness as the first electrode 210 described above. In addition, the second electrode 220 may be formed in the same or similar shape as the first electrode 210 described above. For example, the second electrode 220 may be arranged as a surface electrode or a plurality of pattern electrodes.

The first substrate 110 and the second substrate 120 may have the same or different sizes.

In detail, the first length extending in the first direction (1D) of the first substrate 110 may be the same as or similar to the second length extending in the first direction 1D of the second substrate 120.

For example, the first length and the second length may have a size of 300 mm to 400 mm.

In addition, the first width extending in the second direction (2D) of the first substrate 110 may have the same or similar to the second width extending in the second direction of the second substrate 120.

For example, the first width and the second width may have a size of 150 mm to 200 mm.

In addition, the first substrate 110 and the second substrate 120 may be formed to have different areas.

Figure 2:
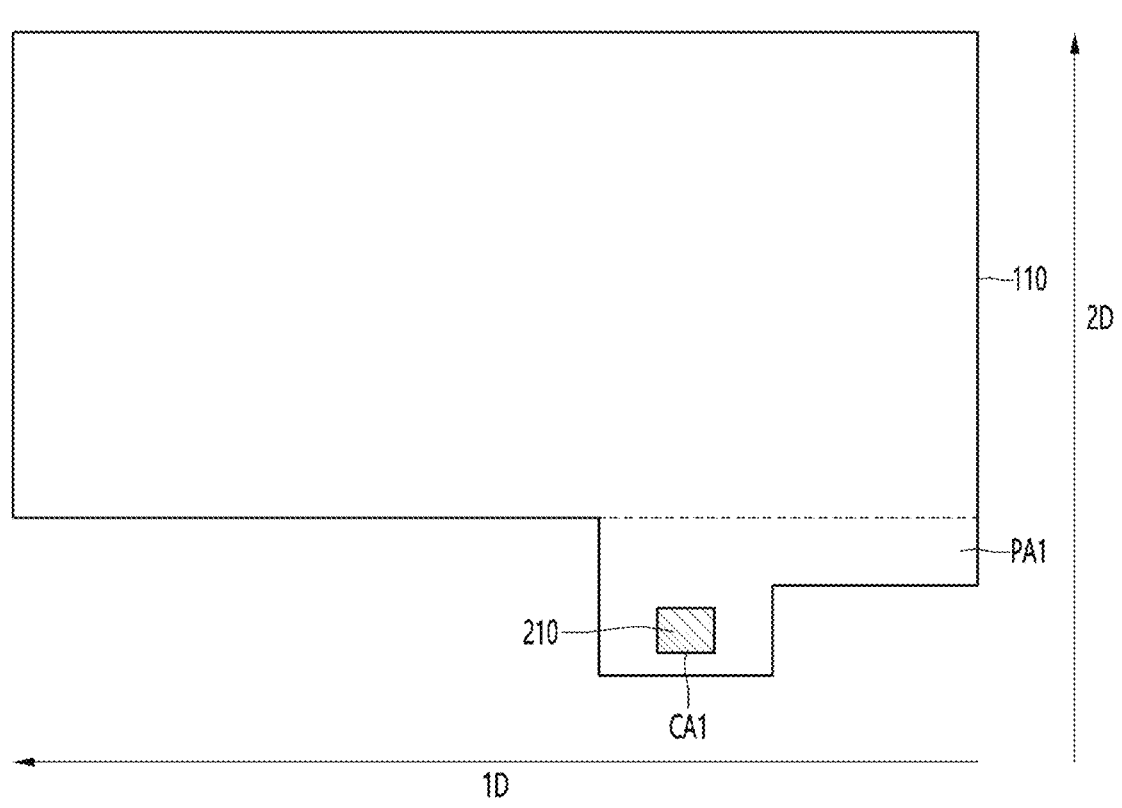
FIG. 2 is a top view of a first substrate of an optical path control member according to an embodiment.
Figure 3:
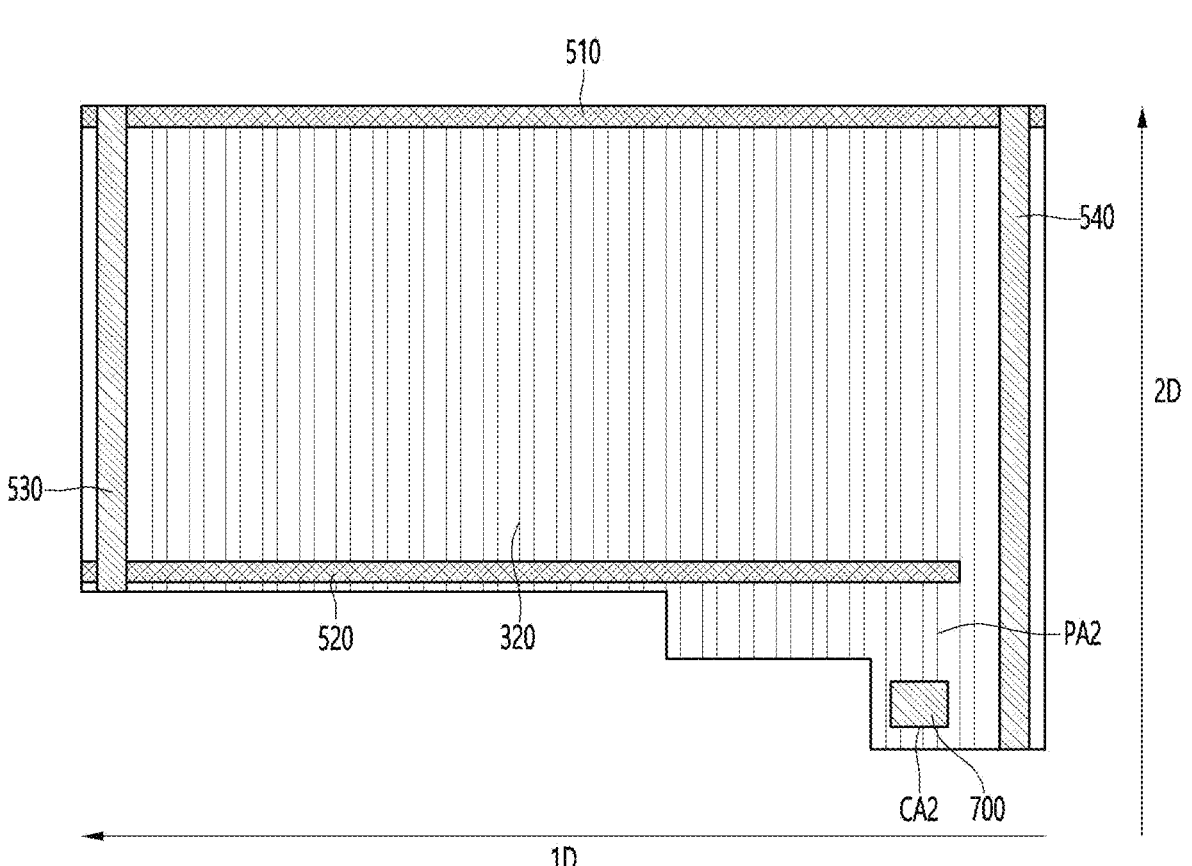
FIG. 3 is a top view of a second substrate of an optical path control member according to an embodiment.

In detail, the first substrate 110 and the second substrate 120 may include protrusion. Referring to FIGS. 2 and 3, the first substrate 110 may include a first protrusion PA1, and the second substrate 120 may include a second protrusion PA2. The first protrusion PA1 and the second protrusion PA2 may be arranged not to overlap each other in the third direction (3D).

Alternatively, the embodiment is not limited thereto, the first protrusion PA1 and the second protrusion PA2 may include an overlapping region overlapping each other in the third direction and a non-overlapping region not overlapping each other in the third direction.

At this time, the first protrusion PA1 and the second protrusion PA2 may have different areas. That is, the first substrate 110 and the second substrate 120 may have different sizes by a size difference between the protrusions.

A connection region connected to an external (flexible) printed circuit board may be formed in each of the first protrusion PA1 and the second protrusion PA2.

In detail, a first connection region CA1 may be disposed in the first protrusion PA1, and a second connection region CA2 may be disposed in the second protrusion PA2.

A conductive material may be exposed on upper surfaces of the first connection region CA1 and the second connection region CA2, respectively. For example, the first electrode 210 may be exposed in the first connection region CA1, and a conductive material may be exposed in the second connection region CA2. That is, a cutting region for filling a conductive material 700 is formed in the second protrusion PA2 of the second substrate 120. In addition, the conductive material may be filled inside the cutting region. As a result, the second connection region CA2 can be formed.

As a result, the optical path control member can be electrically connected to an external (flexible) printed circuit board through the first connection region CA1 and the second connection region CA2.

For example, pad portions may be disposed on the first connection region CA1 and the second connection region CA2. In addition, a conductive adhesive including at least one of an anisotropic conductive film (ACF) and an anisotropic conductive paste (ACP) may be disposed between the pad portion and the (flexible) printed circuit board. As a result, the optical path control member and an external printed circuit board can be connected.

Alternatively, a conductive adhesive comprising at least one of an anisotropic conductive film (ACF) and an anisotropic conductive paste (ACP) can be disposed between the first connection region CA1 and the second connection region CA2 and the (flexible) printed circuit board. As a result, the optical path control member and an external printed circuit board can be directly connected without the pad portion.

The light conversion unit 300 may be disposed between the first substrate 110 and the second substrate 120. In detail, the light conversion unit 300 may be disposed between the first electrode 210 and the second electrode 220.

An adhesive layer and a buffer layer may be disposed between the light conversion unit 300 and the first substrate 110 and between the light conversion unit 300 and the second substrate 120, respectively. The first substrate 110, the second substrate 120, and the light conversion unit 300 may be adhered to each other by the adhesive layer and the buffer layer.

For example, the adhesive layer 410 is disposed between the first electrode 210 and the light conversion unit 300. As a result, the first substrate 110 and the light conversion unit 300 can be adhered.

The adhesive layer 410 may have a thickness within a set range. For example, the adhesive layer 410 may have a thickness of 10 μm to 30 μm.

In addition, a buffer layer 420 is disposed between the second electrode 220 and the light conversion unit 300. As a result, the adhesion between the second electrode 220 and the light conversion unit 300, which contain different types of materials, can be improved.

The buffer layer 420 may have a thickness within a set range. For example, the buffer layer 420 may have a thickness of less than 1 μm.

The light conversion unit 300 may include a plurality of partition wall parts 310 and an accommodating part 320. A light conversion material 330 may be disposed in the accommodating part 320. The light conversion material 330 includes light conversion particles that move according to the application of voltage and a dispersion liquid for dispersing the light conversion particles. The light transmission characteristics of the optical path control member may be changed by the light conversion particles.

The accommodating part 320 may be arranged to extend in one direction. In detail, the accommodating part 320 may extend in the second direction (2D). Accordingly, the accommodating part 320 may contact a first sealing part 510 and a second sealing part 520. That is, the accommodating part 320 may be sealed by the first sealing part 510 and the second sealing part 520.

Figure 5:
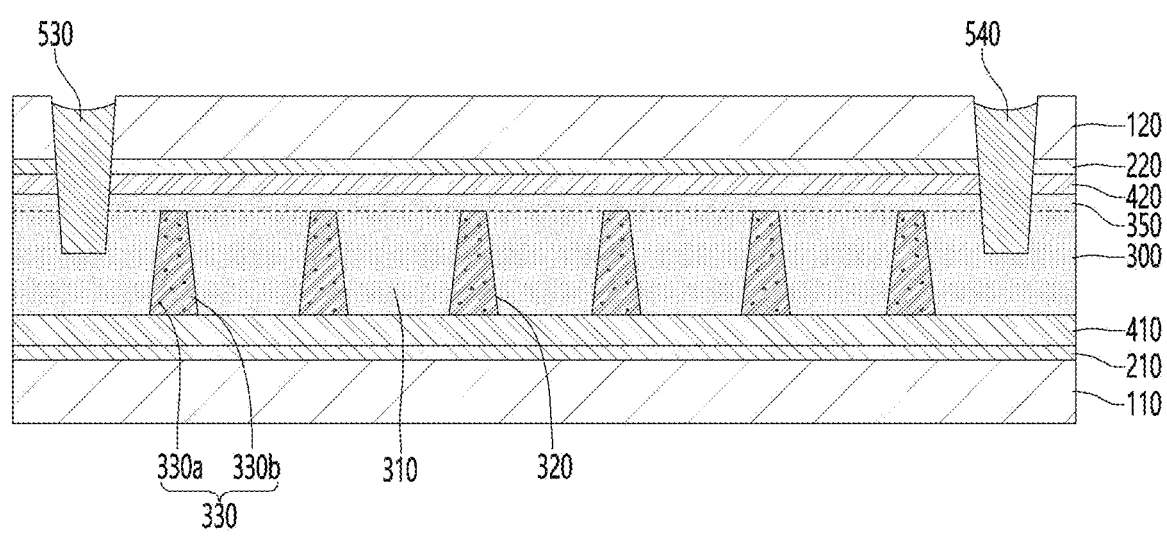
FIGS. 5 and 6 are cross-sectional views taken along a A-A' region of FIG. 1.
Figure 6:
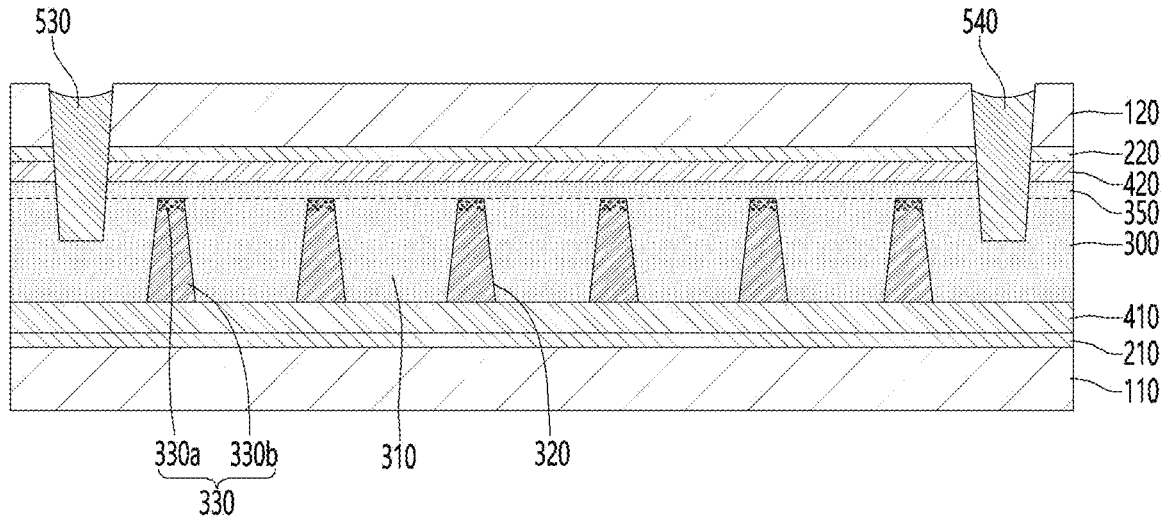

FIGS. 5 and 6 are cross-sectional views taken along line A-A' of FIG. 1.

Referring to FIGS. 5 and 6, the light conversion unit 300 may include a partition wall part 310 and an accommodating part 320.

The partition wall part 310 may be defined as a partition wall region that separates a plurality of accommodating parts. The partition wall part 310 can transmit light. That is, light emitted from the direction of the first substrate 110 or the second substrate 120 may pass through the partition wall part.

The partition wall part 310 and the accommodating part 320 may be arranged at different widths. For example, the width of the partition wall part 310 may be greater than the width of the accommodating part 320.

In addition, the accommodating part 320 may be formed in a shape whose width narrows while extending from the first electrode 210 toward the second electrode 220.

The partition wall part 310 and the accommodating part 320 may be arranged alternately. That is, each partition wall part 310 is disposed between the accommodating parts 320 adjacent to each other. In addition, each accommodating part 320 is disposed between the partition wall parts 310 adjacent to each other.

The partition wall part 310 may include a transparent material. The partition wall part 310 may include a material capable of transmitting light.

The partition wall part 310 may include a resin material. For example, the partition wall part 310 may include a photocurable resin material. For example, the partition wall part 310 may include UV resin or transparent photoresist resin. Alternatively, the partition wall part 310 may include urethane resin or acrylic resin.

The accommodating part 320 may be formed to partially penetrate the light conversion unit 300. Accordingly, the accommodating part 320 is disposed in contact with the adhesive layer 410. In addition, the accommodating part 3200 is disposed to be spaced apart from the buffer layer 420. Accordingly, a base part 350 may be formed between the accommodating part 320 and the buffer layer 420.

A light conversion material 330 may be disposed in the accommodating part 320. The light conversion material 330 includes light conversion particles 330a and a dispersion liquid 330b in which the light conversion particles 330a are dispersed.

The dispersion liquid 330b may disperse the light conversion particles 330a. The dispersion liquid 330b may include a transparent material. The dispersion liquid 330b may include a non-polar solvent. In addition, the dispersion liquid 330b may include a light-transmitting material. For example, the dispersion 330b may include at least one of halocarbon oil, paraffin oil, and isopropyl alcohol.

The light conversion particles 330a may include a material capable of absorbing light. That is, the light conversion particles 330a may be light absorbing particles. In addition, the light conversion particles 330a may have a color. For example, the light conversion particles 330a may have a black-based color. For example, the light conversion particles 330a may include carbon black particles.

The light conversion particles 330a may have a polarity by charging a surface thereof. For example, the surface of the light conversion particles 330a may be charged with a negative (–) charge. Accordingly, according to the application of the voltage, the light conversion particles 330a may move toward the first electrode 210 or the second electrode 220.

The light conversion particles 330a may be dispersed or aggregated within the dispersion liquid 330b. Accordingly, the light transmittance of the accommodating part 320 may be changed by the light conversion particles 330a. By this, the accommodating part 320 can be converted into a light blocking part and a light transmitting part.

For example, the optical path control member may be switched from a first mode to a second mode by the voltage applied to the first electrode 210 and the second electrode 220. Alternatively, the optical path control member may switch from the second mode to the first mode.

In detail, in the optical path control member according to the embodiment, the accommodating part 320 becomes a light blocking part in the first mode. As a result, the accommodating part 320 can block light within a set angle. Accordingly, a viewing angle of the user viewing from the outside is narrowed. That is, the optical path control member can be driven in a privacy mode.

In addition, in the optical path control member according to the embodiment, the accommodating part 320 becomes a light transmitting part in the second mode. As a result, light is transmitted through both the partition wall part 310 and the accommodating part 320. Accordingly, the viewing angle of the user viewing from the outside is widened. That is, the optical path control member can be driven in a public mode.

Switching from the first mode to the second mode, that is, the conversion of the accommodating part 320 from the light blocking part to the light transmitting part may be realized by movement of the light conversion particles 330a of the accommodating part 320. That is, the light conversion particles 330a may have a charge on the surface thereof and may move toward the first electrode or the second electrode according to the application of a voltage according to characteristics of the charge.

For example, when a voltage is not applied to the optical path control member from the outside, the light conversion particles 330a of the accommodating part 320 are uniformly dispersed in the dispersion liquid 330b, and the accommodating part 320 may block light by the light conversion particles. Accordingly, in the first mode, the accommodating part 320 may be driven as the light blocking part.

In addition, when a voltage is applied to the optical path control member from the outside, the light conversion particles 330a may move. For example, the light conversion particles 330a may move toward one end or the other end of the accommodating part 320 by a voltage transmitted through the first electrode 210 and the second electrode 220.

That is, the light conversion particles 330a may move from the accommodating part 320 toward the first electrode 210 or the second electrode 220.

For example, when a voltage is applied to the first electrode 210 and/or the second electrode 220, an electric field is formed between the first electrode 210 and the second electrode 220, and the light conversion particles 330a charged with the negative charge may move toward a positive electrode of the first electrode 210 and the second electrode 220 using the dispersion liquid 330b as a medium.

As an example, in the initial mode or when the voltage is not applied to the first electrode 210 and/or the second electrode 220, as shown in FIG. 5, the light conversion particles 330a may be uniformly dispersed in the dispersion liquid 330b, and the accommodating part 320 may be driven as the light blocking part.

In addition, when the voltage is applied to the first electrode 210 and/or the second electrode 220, as shown in FIG. 6, the light conversion particles 330a may move toward the second electrode 220 in the dispersion liquid 330b. That is, the light conversion particles 330a move in one direction, and the accommodating part 320 may be driven as the light transmitting part.

Accordingly, the optical path control member according to the embodiment may be driven in two modes according to a user's surrounding environment. That is, when the user requires light transmission only at a specific viewing angle, the accommodating part is driven as the light blocking part. Alternatively, in an environment in which the user requires high brightness, a voltage may be applied to drive the accommodating part as the light transmitting part.

Therefore, the optical path control member according to the embodiment may be implemented in two modes according to the user's requirement.

Figure 4:
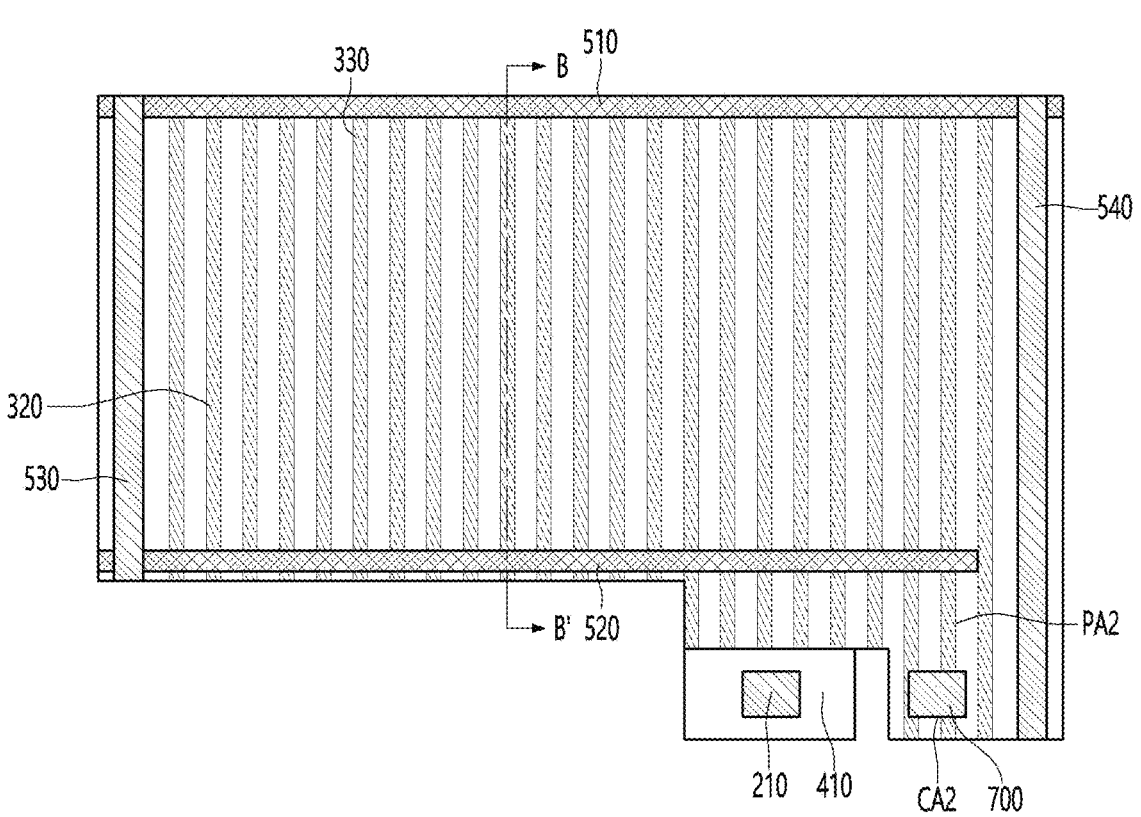
FIG. 4 is a top view of a second substrate in which the first and second substrates of an optical path control member according to an embodiment are laminated.
Figure 7:
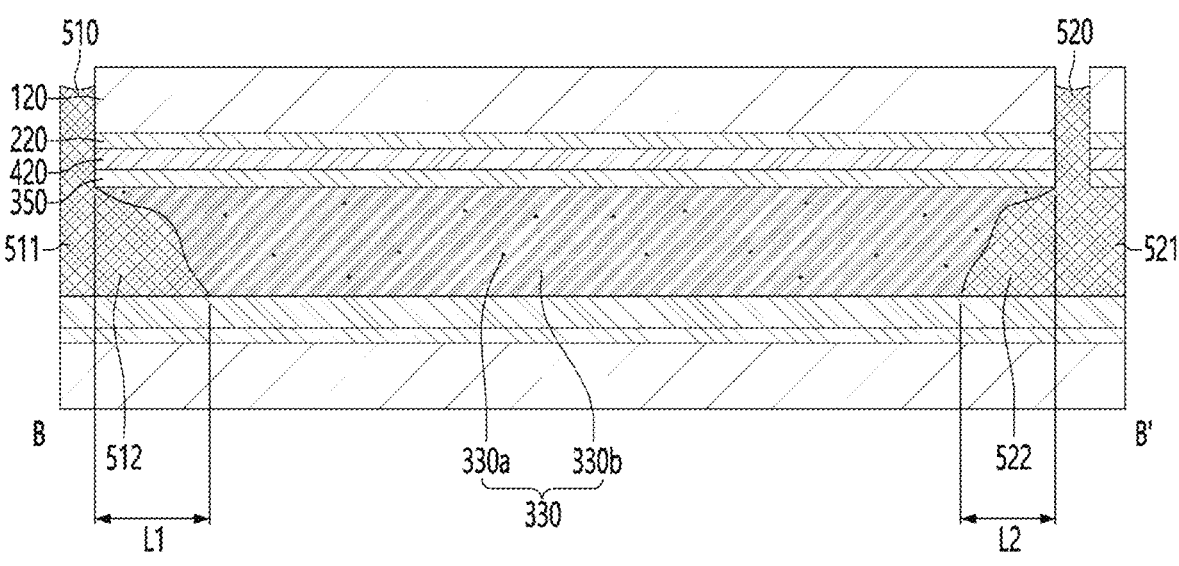
FIG. 7 is a cross-sectional view taken along a B-B' region of FIG. 4.

Referring to FIGS. 1, 4, and 7, the optical path control member may include a sealing part. The sealing part may seal the light conversion material.

The sealing part may include a sealing part extending in the first direction (1D) and a sealing part extending in the second direction (2D). For example, the sealing part may include a first sealing part 510 and a second sealing part 520 extending in the first direction 1D. The first sealing part 510 and the second sealing part 520 may be arranged to face each other in the second direction (2D).

In addition, the sealing part may include a third sealing part 530 and a fourth sealing part 540 extending in the second direction (2D). The third sealing part 530 and the fourth sealing part 540 may be arranged to face each other in the first direction 1D.

The first sealing part 510, the second sealing part 520, the third sealing part 530, and the fourth sealing part 540 may be disposed at an edge region of the optical path control member.

In addition, the first sealing part 510, the second sealing part 520, the third sealing part 530, and the fourth sealing part 540 may be disposed to be connected to each other. In detail, the first sealing part 510, the second sealing part 520, the third sealing part 530, and the fourth sealing part 540 may be disposed to be connected to each other except for an open region OA. The open region (OA) is defined as a region for electrifying the second connection region (CA2) and the second electrode 220.

The first sealing part 510, the second sealing part 520, the third sealing part 530, and the fourth sealing part 540 may be formed by a cutting region formed in the optical path control member 1000.

For example, the optical path control member 1000 may include a cutting region formed by removing part or all of the second substrate 120, the second electrode 220, the buffer layer 420, and the light conversion unit 300. The first sealing part 510, the second sealing part 520, the third sealing part 530, and the fourth sealing part 540 may be disposed inside the cutting region.

In detail, light conversion material 330 can be injected into the accommodating part 320 through the cutting region. Subsequently, a sealing material can be disposed inside the cutting region. By this, the light conversion material 330 can be sealed. For example, a cutting region in which the first sealing part 510 is disposed may be an injection part for injecting a light conversion material. In addition, a cutting region in which the second sealing part 520 is disposed may serve as a suction part for sucking in the light conversion material. That is, the light conversion material 330 can move from the injection part toward the suction part.

At least one of the first sealing part 510, the second sealing part 520, the third sealing part 530, and the fourth sealing parts 540 may be directly exposed to an outermost surface of the optical path control member 1000. For example, the first sealing part 510 may be directly exposed to the outermost surface of the optical path control member 1000. That is, one of the outermost surfaces of the optical path control member 1000 may include the first sealing part 510. That is, one of the outermost surfaces of the optical path control member 1000 may be the first sealing part 510.

Any one of the first sealing part 510, the second sealing part 520, the third sealing part 530, and the fourth sealing part 540 may have a width smaller than a width of the other sealing part. In detail, the width of the first sealing part 510 may be smaller than the widths of the second sealing part 520, the third sealing part 530, and the fourth sealing part 540.

During the manufacturing process, some regions of the first sealing part 510 may be cut and removed. Accordingly, the first sealing part 510 can be disposed on the outermost surface of the optical path control member. Accordingly, the width of the first sealing part 510 may be smaller than the widths of the second sealing part 520, the third sealing part 530, and the fourth sealing part 540.

The first sealing part 510 and the second sealing part 520 may be disposed in contact with both ends of the accommodating part 320. Accordingly, the light conversion material 330 inside the accommodating part 320 is not leaked out of the accommodating part 320 by the first sealing part 510 and the second sealing part 520.

The first sealing part 510 and the second sealing part 520 may be disposed inside the accommodating part 320. In detail, portions of the first sealing part 510 and the second sealing part 520 may be disposed inside the accommodating part 320.

In detail, the first sealing part 510 and the second sealing part 520 are formed by injecting a sealing material into the cutting region and curing the sealing material. Before the sealing material is cured, the sealing material has fluidity. Accordingly, the sealing material may move inside the accommodating part while pushing out the light conversion material disposed inside the accommodating part.

Accordingly, some regions of the first sealing part 510 and the second sealing part 520 may be inserted into the accommodating part 320.

Accordingly, it is possible to effectively inhibit external impurities from penetrating into the accommodating part 320.

In the following description, the sealing material disposed in the cutting region is defined as a first sealing region 511 and a second sealing region 521. In addition, the sealing material disposed inside the accommodating part 320 is defined as a first anchor region 512 and a second anchor region 522, respectively.

In detail, the first sealing part 510 includes the first sealing region 511 and the first anchor region 512. In addition, the second sealing part 520 includes the second sealing region 521 and the second anchor region 522.

Each sealing region and each anchor region can be disposed to be connected to each other and can be arranged. In detail, each sealing region and each anchor region may be formed integrally.

The first anchor region 512 and the second anchor region 522 may be disposed inside each accommodating part.

As previously described, the first sealing part 510 among the plurality of sealing parts is exposed to the outermost surface of the optical path control member. The first sealing part 510 is formed to have a smaller width than other sealing parts during the process. As a result, external moisture may flow in through the first sealing part 510.

As a result, the sealing characteristics of the first sealing part 510 may be reduced. In addition, moisture that has penetrated into the first sealing part 510 may be recognized as a stain from the outside. In addition, the adhesive characteristics of the first sealing part 510 and the adhesive layer 410 may be reduced.

Hereinafter, an optical path control member capable of improving sealing characteristics, appearance characteristics, and adhesion characteristics of a sealing part exposed in the optical path control member will be described.

Referring to FIG. 7, the first sealing part 510 and the second sealing part 520 may be arranged in different sizes. In detail, sizes of a first anchor region 512 and a second anchor region 522 disposed inside each accommodating part 320 may be different.

A length L1 of the first anchor region 512 may be different from a length L2 of the second anchor region 522. In detail, the length L1 of the first anchor region 512 may be greater than the length L2 of the second anchor region 522. That is, in the accommodating part 320, the length of the anchor region of the region corresponding to the injection part may be greater than the length of the anchor region corresponding to the suction part.

A process of filling the light conversion material 300 into the accommodating part 320 may be performed using a vacuum pad. That is, the light conversion material 330 can be filled into the accommodating part 320 while the optical path control member is pressed with a vacuum pad.

Subsequently, a cutting region corresponding to the injection part and the suction part can be sealed using the first sealing part 510 and the second sealing part 520.

The vacuum pad can then be removed. Accordingly, the light conversion material inside the accommodating part, which was in a negative pressure state by the vacuum pad, changes to normal pressure. Accordingly, the first sealing part 510 and the second sealing part 520 disposed inside the cutting region move in an inner direction of the accommodating part 320. By this, an anchor region can be formed inside the accommodating part.

At this time, a width of the cutting region of the injection part may be formed to be wider than a width of the cutting region of the suction part. Accordingly, an amount of sealing material filled into the cutting region of the injection part may be greater than an amount of sealing material filled into the cutting region of the suction part. Therefore, the amount of sealing material inserted into the accommodating part from the cutting region of the injection part may be greater than the amount of sealing material inserted into the accommodating part from the cutting region of the suction part.

Accordingly, the first anchor region 512 may be formed to be larger than the second anchor region 522.

The first anchor region 512 and the second anchor region 522 may be formed to have a length within a set range. In detail, the length of the first anchor region 512 and the second anchor region 522 may be 10 µm or more. In more detail, the length of the first anchor region 512 and the second anchor region 522 may be 100 µm to 800 µm. In more detail, the length of the first anchor region 512 and the second anchor region 522 may be 300 µm to 750 µm. In more detail, the length of the first anchor region 512 and the second anchor region 522 may be 400 µm to 700 µm.

If the length of the first anchor region 512 and the second anchor region 522 exceeds 800 µm, an area of an effective region (light conversion area) is reduced by the sealing part disposed inside the accommodating part 320. Thereby, the size of the optical path control member can be increased.

In addition, if the length of the first anchor region 512 and the second anchor region 522 is less than 10 µm, moisture may flow into the accommodating part 320 through a sealing part disposed inside the accommodating part 320. This may cause stains to form on the accommodating part. In addition, the light conversion efficiency may be reduced, thereby reducing the light conversion efficiency of the optical path control member.

The length L1 of the first anchor region 512 may be greater than the length L2 of the second anchor region 522 within the above-described length range.

The first anchor region 512 may have a length (L1) within a set range. In detail, the length L1 of the first anchor region 512 may be greater than 50 µm. In more detail, the length L1 of the first anchor region 512 may be 100 µm to 800 µm. In more detail, the length L1 of the first anchor region 512 may be 500 µm to 700 µm.

In addition, the second anchor region 522 may have a length (L2) within a set range. In detail, the length L2 of the second anchor region 522 may be greater than 10 µm. In more detail, the length (L2) of the second anchor region 522 may be 20 µm to 400 µm. In more detail, the length L1 of the second anchor region 522 may be 50 µm to 400 µm.

In addition, the second anchor region 522 may have a length (L2) within a set range. In detail, the length L2 of the second anchor region 522 may be greater than 10 µm. In more detail, the length (L2) of the second anchor region 522 may be 20 µm to 400 µm. In more detail, the length L1 of the second anchor region 522 may be 50 µm to 400 µm.

The length of the first anchor region 512 and the length of the second anchor region 522 may have a difference within a set range. In detail, a difference (L1–L2) between the length of the first anchor region 512 and the length of the second anchor region 522 may be 50 µm or more. In more detail, the difference between the length of the first anchor region 512 and the length of the second anchor region 522 may be 100 µm or more. In more detail, the difference between the length of the first anchor region 512 and the length of the second anchor region 522 may be 200 µm or more. In more detail, the difference between the length of the first anchor region 512 and the length of the second anchor region 522 may be 100 µm to 300 µm.

If the difference (L1-L2) between the length of the first anchor region 512 and the length of the second anchor region 522 exceeds 300 µm, a bezel region at an upper portion (a region where the first sealing part is disposed) and a lower portion (a region where the second sealing part is disposed) of the optical path control member is increased. Thereby, the size of the optical path control member can be increased.

Hereinafter, an optical path control member according to the second embodiment will be described with reference to FIGS. 8 to 10. In the description of the optical path control member according to the second embodiment, descriptions that are the same as those of the optical path control member according to the previously described embodiment will be omitted, and identical components will be assigned the same reference numerals.

Figure 8:
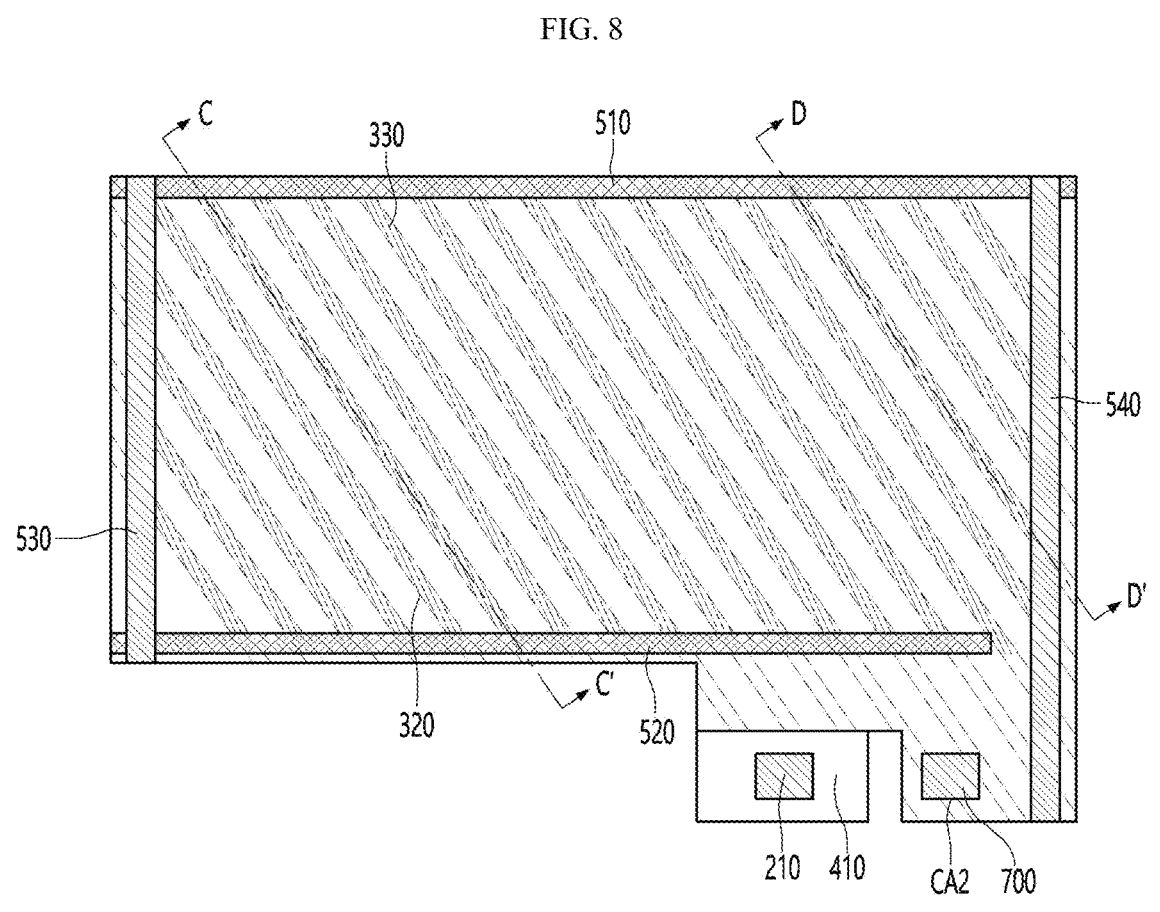

Referring to FIG. 8, in the optical path control member according to the second embodiment, the accommodating part 320 may be tilted, unlike the previously described embodiment. In detail, the accommodating part 320 may be tilted at an angle within a set range.

For example, the accommodating part 320 may extend in a direction different from the first direction 1D and the second direction 2D. That is, the accommodating part 320 may be tilted with respect to the first direction (1D) and the second direction (2D). For example, the accommodating part 320 may extend in a direction between the first direction 1D and the second direction 2D.

In detail, at least one of the accommodating parts may be in contact with the first sealing part 510 and the second sealing part 520. In addition, at least one of the accommodating parts may be in contact with the first sealing part 510 and the fourth sealing part 540. In addition, at least one of the accommodating parts may extend in a fourth-first direction in contact with the second sealing part 520 and the third sealing part 530.

Accordingly, the accommodating parts 320 may be sealed by the same or different sealing parts.

For example, at least one of the accommodating parts 320 may be sealed by the first sealing part 510 and the fourth sealing part 540. In addition, at least one of the accommodating parts 320 may be sealed by the first sealing part 510 and the second sealing part 520. In addition, at least one of the accommodating parts 320 may be sealed by the second sealing part 520 and the third sealing part 530.

Since the accommodating part 320 is tilted at an inclination angle of a set size with respect to the first direction 1D and the second direction 2D, when the optical path control member is coupled with the display panel, it is possible to inhibit moiré phenomenon that occurs when the accommodating part overlaps with the pattern part of the display panel.

Since the accommodating part 320 is tilted at a set inclination angle, the length of each accommodating part may be different. In detail, the length of the accommodating part 320 may change while extending in the first direction 1D. In more detail, the length of the accommodating part 320 may increase and then decrease while moving from the third sealing part 530 to the fourth sealing part 540.

At least one of the third sealing part 530 and the fourth sealing part 540 may be disposed inside the accommodating part 320. In detail, a portion of at least one of the third sealing part 530 and the fourth sealing part 540 may be disposed inside the accommodating part 320.

In detail, the third sealing part 530 and the fourth sealing part 540 are formed by injecting a sealing material into the cutting region and curing the sealing material in the same manner as the first sealing part 510 and the second sealing part 520. Accordingly, at least one of the third sealing part 530 and the fourth sealing part 540 may include an anchor region disposed inside the accommodating part.

Accordingly, the third sealing part 530 may include a third sealing region 531 and a third anchor region 532. Alternatively, the fourth sealing part 540 may include a fourth sealing region 541 and a fourth anchor region 542.

Figure 9:
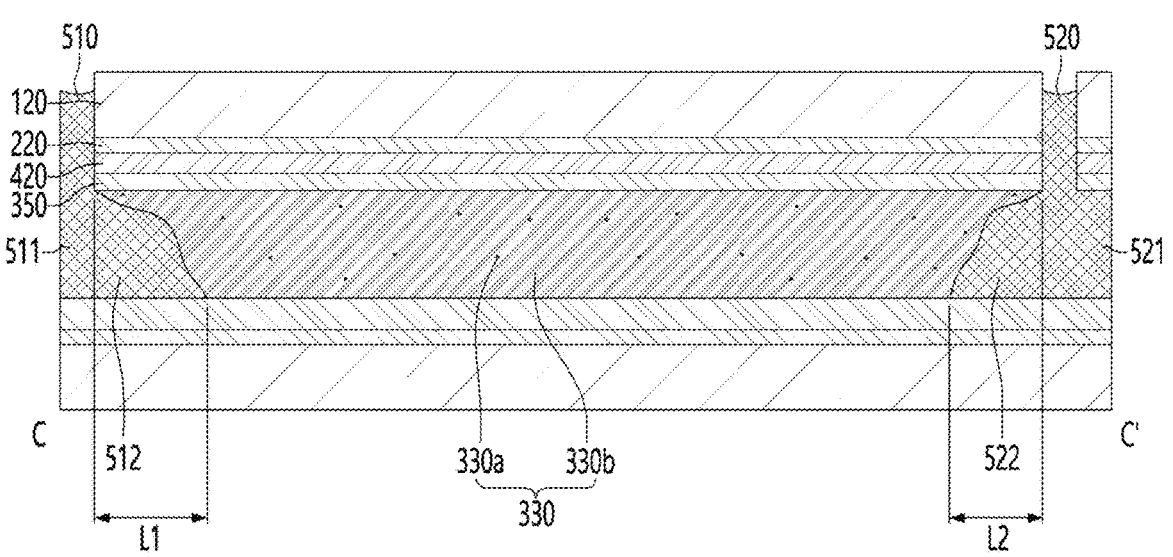
FIG. 9 is a cross-sectional view taken along a C-C' region of FIG. 8.

Referring to FIG. 9, an anchor length (L1) of the first sealing part 510 may be larger than an anchor length (L2) of the second sealing part. That is, regardless of the direction of the accommodating part 320, the anchor length L1 of the first sealing part 510 may be greater than the anchor length L2 of the second sealing part. This is the same as the above-described embodiment, and thus the following description will be omitted.

Figure 10:
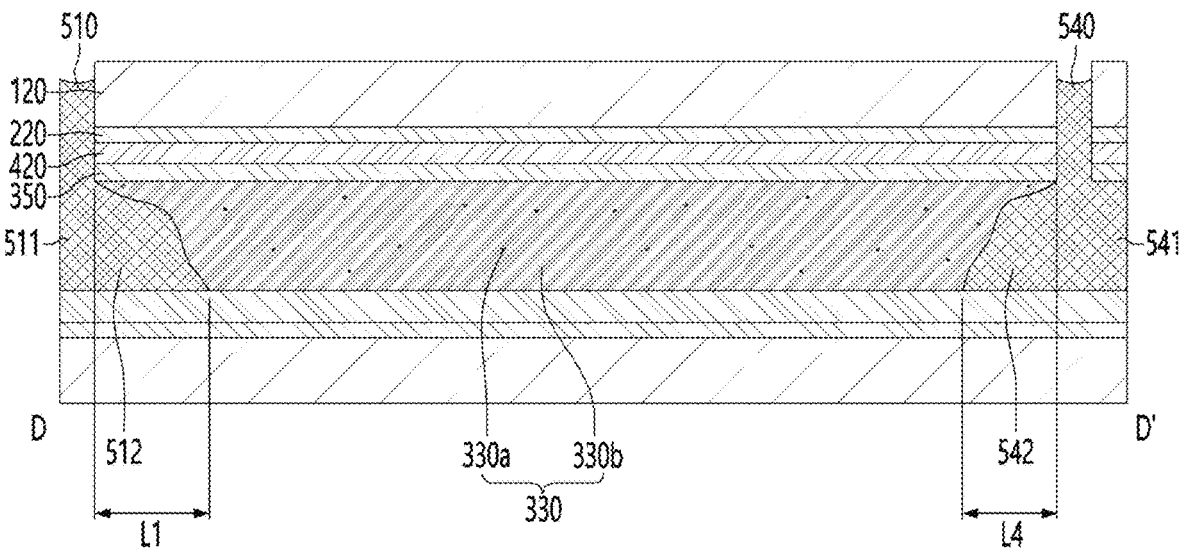
FIG. 10 is a cross-sectional view taken along a D-D' region of FIG. 8.

Referring to FIG. 10, an anchor length (L1) of the first sealing part 510 may be greater than an anchor length (L4) of the fourth sealing part.

The first anchor region 512 and the fourth anchor region 542 may be formed to have a length within a set range. In detail, the length of the first anchor region 512 and the fourth anchor region 542 may be 10 μm or more. In more detail, the length of the first anchor region 512 and the fourth anchor region 542 may be 10 μm to 800 μm. In more detail, the length of the first anchor region 512 and the fourth anchor region 542 may be 20 μm to 700 μm.

The length L1 of the first anchor region 512 may be greater than the length L4 of the fourth anchor region 542 within the above-described length range.

Hereinafter, an optical path control member according to a third embodiment will be described with reference to FIGS. 11 to 13. In the description of the optical path control member according to the third embodiment, descriptions that are identical to and similar to the optical path control member according to the previously described embodiments will be omitted. In addition, the same reference numerals are assigned to the same components.

Figure 11:
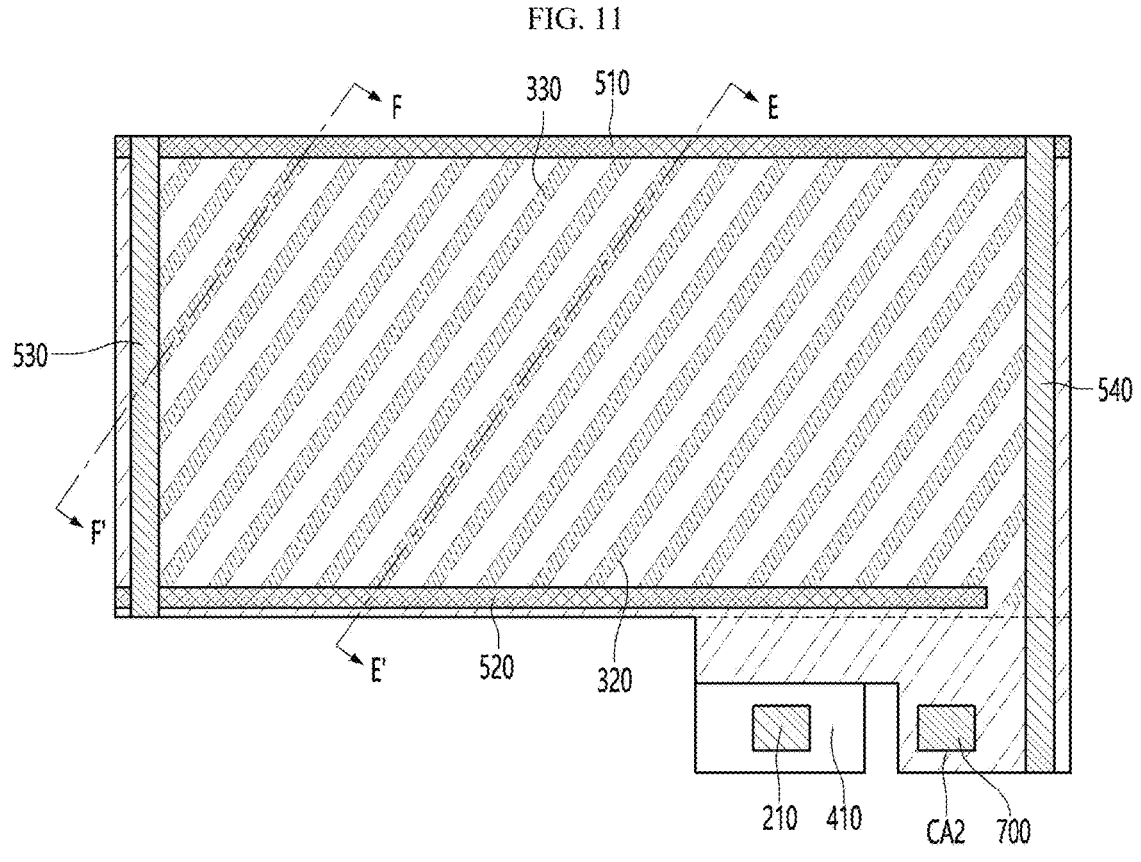
FIG. 11 is a top view of a second substrate in which the first and second substrates of the optical path control member according to a third embodiment are laminated.

Referring to FIG. 11, the optical path control member according to the third embodiment may be arranged so that the accommodating part 320 is tilted, unlike the previously described embodiment. In detail, the accommodating part 320 may be tilted at an angle within a set range. That is, the optical path control member according to the third embodiment may have an accommodating part tilted in a different direction from the previously described second embodiment.

In detail, at least one of the accommodating parts may be in contact with the first sealing part 510 and the second sealing part 520. In addition, at least one of the accommodating parts may be in contact with the first sealing part 510 and the third sealing part 530. In addition, at least one of the accommodating parts may extend in a fourth-second direction in contact with the second sealing part 520 and the fourth sealing part 540.

Accordingly, the accommodating parts 320 may be sealed by the same or different sealing parts.

For example, at least one of the accommodating parts 320 may be sealed by the first sealing part 510 and the third sealing part 530. In addition, at least one of the accommodating parts 320 may be sealed by the first sealing part 510 and the second sealing part 520. In addition, at least one of the accommodating parts 320 may be sealed by the second sealing part 520 and the fourth sealing part 540.

Figure 12:
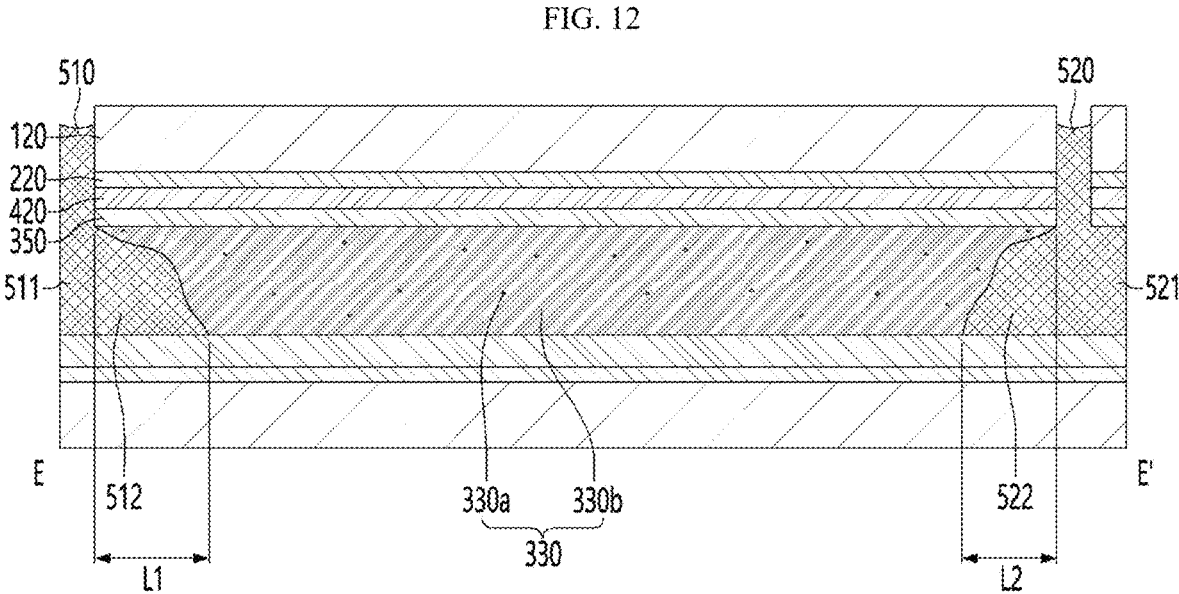
FIG. 12 is a cross-sectional view taken along a E-E' region of FIG. 11.

Referring to FIG. 12, an anchor length (L1) of the first sealing part 510 may be greater than an anchor length (L2) of the second sealing part. That is, regardless of the direction of the accommodating part 320, the anchor length L1 of the first sealing part 510 may be greater than the anchor length L2 of the second sealing part. This is the same as the above-described embodiment, and thus the following description will be omitted.

Figure 13:
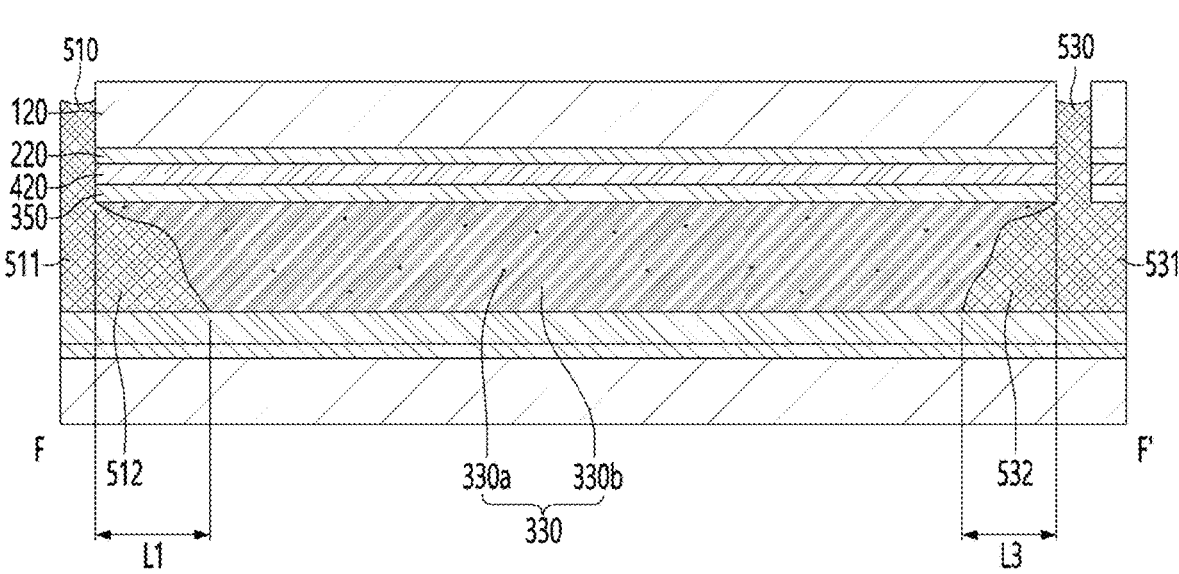
FIG. 13 is a cross-sectional view taken along a F-F' region of FIG. 11.

Referring to FIG. 13, the anchor length L1 of the first sealing part 510 may be greater than the anchor length L3 of the third sealing part.

The first anchor region 512 and the third anchor region 532 may be formed to have a length within a set range. In detail, the length of the first anchor region 512 and the third anchor region 532 may be 10 μm or more. In more detail, the length of the first anchor region 512 and the third anchor region 532 may be 10 μm to 800 μm. In more detail, the length of the first anchor region 512 and the third anchor region 532 may be 20 μm to 700 μm.

The length L1 of the first anchor region 512 may be greater than the length L3 of the third anchor region 532 within the above-described length range.

The optical path control member according to embodiments may form the anchor region of the first sealing part to be larger than the anchor regions of other sealing parts. That is, the size of the anchor region of the first sealing part may be larger than the size of the anchor region of at least one of the second sealing part, the third sealing part, and the fourth sealing part.

Accordingly, it is possible to inhibit moisture from flowing into the accommodating part through the first sealing part.

The first sealing part has a smaller width than other sealing parts and may be exposed to the outside of the optical path control member. Accordingly, the first sealing part may be more vulnerable to moisture and external impact than other sealing parts.

Accordingly, the size of the anchor region of the first sealing part can be made larger than the sizes of the anchor regions of the other sealing parts. As a result, defects in the optical path control member due to moisture penetration can be inhibited.

Therefore, it is possible to inhibit stains from forming on the accommodating part due to the inflow of moisture. In addition, it is possible to inhibit the characteristics of the light conversion material from changing due to mixing of the light conversion material and moisture.

Therefore, the reliability and driving characteristics of the optical path control member can be improved.

As previously described, the sealing material for forming the first sealing part 510, the second sealing part 520, the third sealing part 530, and the fourth sealing part 540 can be included a thermosetting resin. Accordingly, the sealing material requires a process of curing.

The sealing material may be mixed with a light conversion material inside the accommodating part by viscosity before curing. Therefore, after curing the sealing material, the curing characteristics and color of the region in which only the sealing material is cured and the curing region in which the sealing material and the light conversion material are mixed may be changed. Accordingly, the sealing characteristic by the sealing part may be reduced. In addition, the mixed region may be recognized as a stain from the outside.

In order to solve the above problem, the optical path control member according to the fourth and fifth embodiments may preferentially cure at least one of the first sealing part 510, the second sealing part 520, the third sealing part 530, and the fourth sealing part 540. Subsequently, the light conversion material 330 may be filled into the accommodating part 320.

For example, any one of the first sealing part 510, the second sealing part 520, the third sealing part 530, and the fourth sealing part 540 may be cured before filling the light conversion material. In addition, other sealing parts can be cured after filling with light conversion material.

Alternatively, two of the first sealing part 510, the second sealing part 520, the third sealing part 530, and the fourth sealing part 540 may be cured before filling the light conversion material. In addition, the other two sealing parts can be cured after filling with light conversion material.

Alternatively, three of the first sealing part 510, the second sealing part 520, the third sealing part 530, and the fourth sealing part 540 may be cured before filling the light conversion material. In addition, the other sealing part can be cured after filling the light conversion material.

For example, the second sealing part 520, the third sealing part 530, and the fourth sealing part 540 may be cured before filling the light conversion material. In addition, the first sealing part 510 may be cured before filling the light conversion material. That is, the sealing material can be cured in three of the four sealing parts to form sealing parts. In addition, in order to inject the light conversion material, the remaining sealing part can be cured after injecting the light conversion material.

That is, the cutting region in which the first sealing part 510 is formed may be an injection part for injecting a light conversion material into the accommodating part 320.

That is, the sealing material of at least one of the sealing parts may be cured before filling the light conversion material. Accordingly, it is possible to inhibit the sealing material from mixing with the light conversion material as it hardens. Therefore, the curing characteristics of the sealing part can be made uniform. In addition, user visibility can be improved by inhibiting stains due to mixing.

An area and a size of the light conversion material and sealing part disposed inside the accommodating part may change due to differences in the curing order of the sealing materials of the first sealing part 510, the second sealing part 520, the third sealing part 530, and the fourth sealing part 540.

Hereinafter, a description will be made based on a case where the second sealing part 520, the third sealing part 530, and the fourth sealing part 540 are cured before filling the light conversion material, and the first sealing part 510 is cured before filling the light conversion material.

Figure 14:
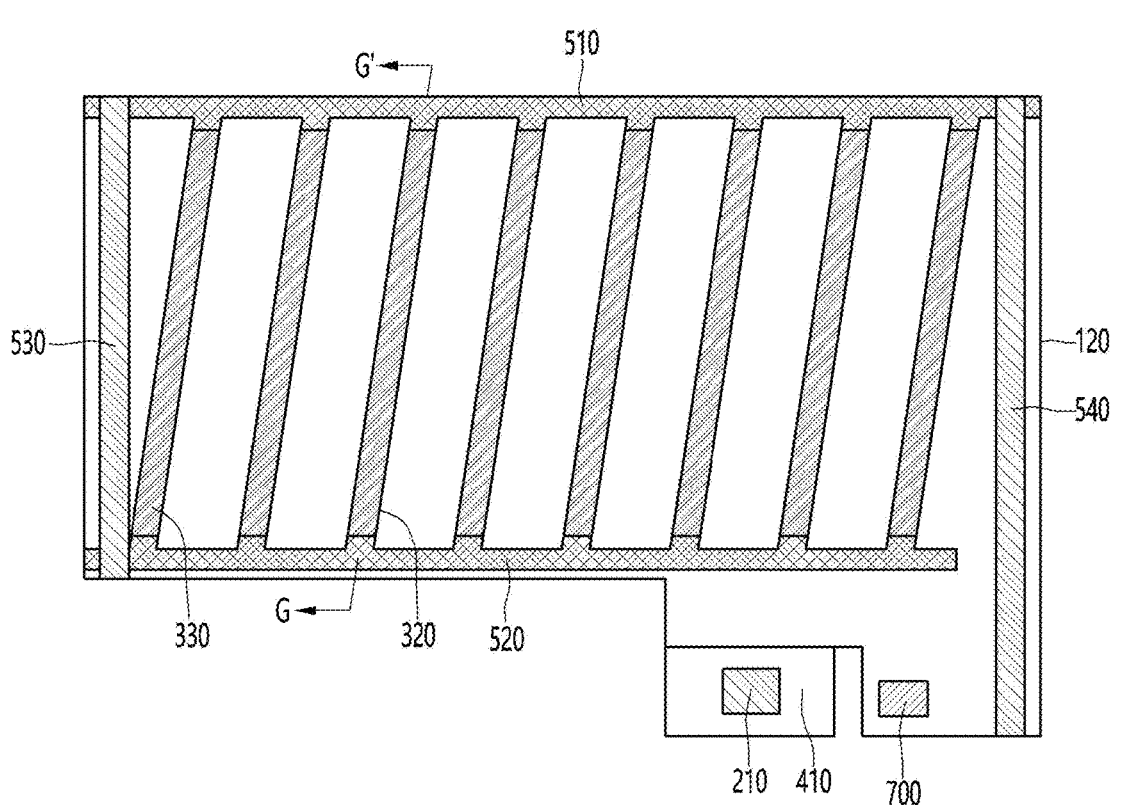
FIG. 14 is a top view of a second substrate in which the first and second substrates of the optical path control member according to a fourth embodiment are laminated.

Hereinafter, an optical path control member according to the fourth embodiment will be described with reference to FIGS. 14 and 15. In the description of the optical path control member according to the fourth embodiment, descriptions that are identical to and similar to the optical path control member according to the previously described embodiments will be omitted. In addition, the same reference numerals are assigned to the same components.

FIG. 15 is a view for explaining an arrangement of the light conversion material and the sealing part disposed inside the accommodating part. In detail, FIG. 15 is a view for explaining a case where the second sealing part 520, the third sealing part 530, and the fourth sealing part 540 are cured before filling the light conversion material, and the first sealing part 510 is cured before filling the light conversion material.

Referring to FIG. 15, the accommodating part 320 may be sealed by a first sealing part 510 and a second sealing part 520.

The first sealing part 510 may be cured after the light conversion material 330 is filled in the accommodating part 320. In addition, the second sealing part 520 may be cured before the light conversion material 330 is filled into the accommodating part 320.

Accordingly, the first sealing part 510 and the second sealing part 520 may be arranged in different shapes.

The first sealing part 510 may include a region where the width of the first sealing part 510 is narrowed. In detail, the first sealing part 510 may include a region in which a width of the first sealing part 510 is narrowed while extending in a direction from the second substrate 120 toward the first substrate 110.

A sealing material is provided into the first sealing part 510 while the accommodating part 320 is filled with a light conversion material 330. Accordingly, the space in which the light conversion material 330 having fluidity can enter the inside of the accommodating part is small. In addition, when the light conversion material and the sealing material come into contact, the light conversion material may push the sealing material outward. Accordingly, the first sealing part 510 may have a region in which a width thereof is narrowed after the sealing material is cured.

Therefore, the first sealing part 510 may include a region that narrows the width while extending from the second substrate 120 to the first substrate 110 and/or a region that narrows and then widens.

The second sealing part 520 may include a region in which a width of the second sealing part 520 is increased. In detail, the second sealing part 520 may include a region in which a width of the second sealing part 520 is increased while extending from the second substrate 120 toward the first substrate 110.

A sealing material is provided into the second sealing part 520 before the light conversion material 330 is filled inside the accommodating part 320. Accordingly, the sealing material having fluidity flowing through the cutting region can move toward the inside of the accommodating part. Accordingly, the second sealing part 520 may have a region whose width is increased after the sealing material is cured. For example, the second sealing part 520 may be formed to gradually increase in width from the second substrate 120 toward the first substrate 110 after the sealing material is cured.

In addition, the second sealing part 520 may also include a region whose width is narrowed. At this time, the length of the region where the width of the second sealing part 520 is narrowed may be smaller than the length of the region where the width of the first sealing part 510 is narrowed.

In addition, the first sealing part 510 and the second sealing part 520 may be arranged at different lengths within the accommodating part.

In detail, the first length L1 of the first sealing part 510 disposed inside the accommodating part 320 may be smaller than the second length L3 of the second sealing part 520 disposed inside the accommodating part 320. Here, the first length and the second length may each be defined as a maximum length disposed inside the accommodating part 320.

The sealing material is introduced into the first sealing part 510 in a state in which the light conversion material 330 is filled into the accommodating part 320. Accordingly, the space in which the light conversion material 330 having fluidity can enter the accommodating part is small. Also, when the light conversion material and the sealing material are in contact with each other, the light conversion material may push the sealing material outwards.

On the other hand, the sealing material is introduced into the second sealing part 520 before the light conversion material 330 is filled into the accommodating part 320. Accordingly, the sealing material having fluidity may move toward the inside of the accommodating part through a cutting region. That is, the sealing material is introduced into the accommodating part 320 in a state in which the accommodating part 320 is empty. Accordingly, a large amount of the sealing material may be introduced.

Accordingly, the length (L1) of the first sealing part 510 disposed inside the accommodating part 320 can be smaller than the length (L2) of the second sealing part 520 disposed inside the accommodating part 320.

The optical path control member according to the fourth embodiment may allow the sealing part to be cured before injecting the light conversion material for the region other than the region into which the light conversion material is injected.

That is, except for the first sealing part into which the light conversion material is injected, the second sealing part, the third sealing part, and the fourth sealing part may be formed by curing the sealing material before injecting the light conversion material.

Accordingly, the light conversion material is injected after the second sealing part, the third sealing part, and the fourth sealing part are cured. Accordingly, the second sealing part, the third sealing part, and the fourth sealing part have improved curing properties. Therefore, it can have improved sealing properties.

In addition, the second sealing part, the third sealing part, and the fourth sealing part are not mixed with light conversion material, etc. during the curing process. Therefore, stains resulting from this can be inhibited. Thereby, user visibility can be improved.

In addition, the first sealing part is formed by curing a sealing material. after injecting the light conversion material. However, the width of the first sealing part is smaller than the widths of the other sealing parts. As a result, the recognition of stains from the outside can be minimized.

Hereinafter, an optical path control member according to the fifth embodiment will be described with reference to FIGS. 16 to 18. In the description of the optical path control member according to the fifth embodiment, descriptions that are identical to and similar to the optical path control member according to the previously described embodiments will be omitted. In addition, the same reference numerals are assigned to the same components.

Figure 16:
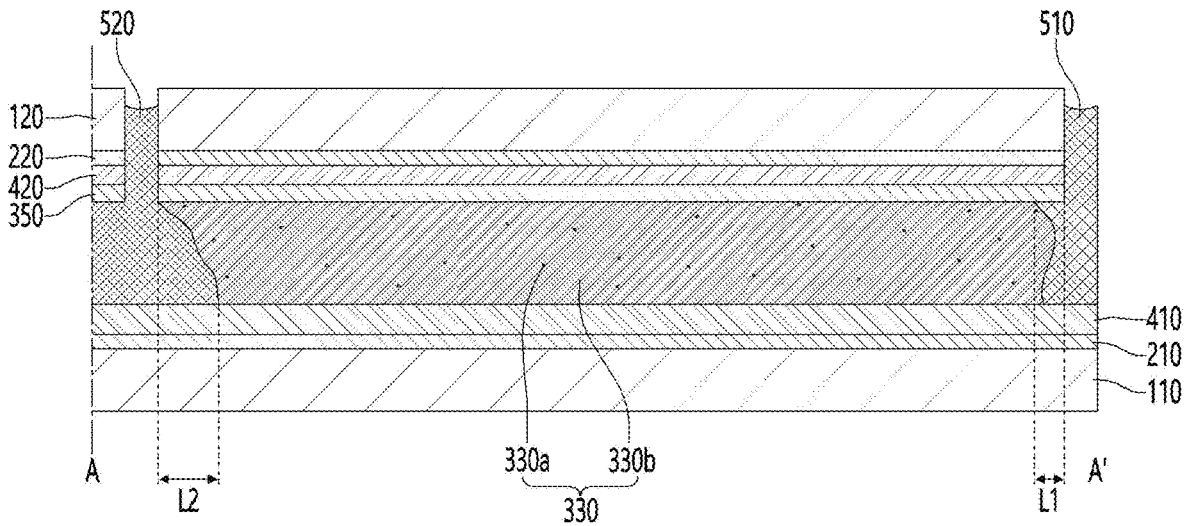
FIG. 16 is a top view of a second substrate in which the first and second substrates of the optical path control member according to a fifth embodiment are laminated.

Referring to FIG. 16, the accommodating part 320 may be disposed in contact with all of the first sealing part 510, the second sealing part 520, the third sealing part 530, and the fourth sealing part 540.

For example, both ends of at least one accommodating part 320 among the plurality of accommodating parts may contact the first sealing part 510 and the third sealing part 530. In addition, both ends of at least one accommodating part 320 among the plurality of accommodating parts may contact the first sealing part 510 and the second sealing part 520. In addition, both ends of at least one accommodating part 320 among a plurality of accommodating parts may contact the second sealing part 520 and the fourth sealing part 540.

Figure 17:
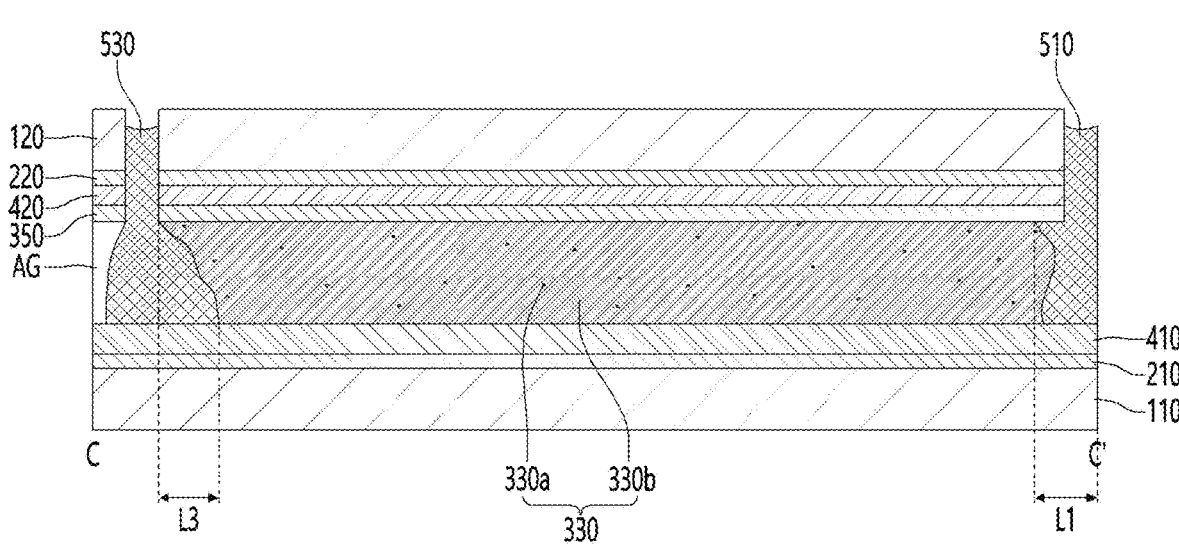
FIG. 17 is a cross-sectional view taken along a H-H' region of FIG. 16.

Referring to FIGS. 16 and 17, the accommodating part 320 may be sealed by a first sealing part 510 and a third sealing part 530.

The first sealing part 510 may be cured after the light conversion material 330 is filled in the accommodating part 320. In addition, the third sealing part 530 may be cured before the light conversion material 330 is filled in the accommodating part 320.

Accordingly, the first sealing part 510 and the third sealing part 530 may be arranged in different shapes.

The first sealing part 510 may include a region where the width of the first sealing part 510 is narrowed. In detail, the first sealing part 510 may include a region in which a width of the first sealing part 510 is narrowed while extending from the second substrate 120 toward the first substrate 110.

A sealing material is introduced into the first sealing part 510 while the accommodating part 320 is filled with a light conversion material 330. Accordingly, a space for the fluid light conversion material 330 to enter the above accommodating part is small. In addition, when the light conversion material and the sealing material come into contact, the light conversion material may push the sealing material outward. Accordingly, the first sealing part 510 may have a region in which a width thereof is narrowed after the sealing material is cured.

Therefore, the first sealing part 510 may include a region that narrows the width while extending from the second substrate 120 to the first substrate 110 and/or a region that narrows and then widens.

The third sealing part 530 may include a region where the width of the third sealing part 530 is widened. In detail, the third sealing part 530 may include a region in which a width of the third sealing part 530 is increased while extending from the second substrate 120 toward the first substrate 110.

The sealing material is introduced into the third sealing part 530 before the light conversion material 330 is filled in the accommodating part 320. Accordingly, the sealing material having fluidity introduced through the cutting region may move in an inner direction of the accommodating part. Accordingly, a region in which a width of the third sealing part 530 is increased after the sealing material is cured may be formed. For example, the third sealing part 530 may be formed to gradually increase in width from the second substrate 120 toward the first substrate 110 after the sealing material is cured.

In addition, the third sealing part 530 may also include a region in which the width is narrowed. In this case, a length of the region in which the width of the third sealing part 530 is narrowed may be smaller than a length of the region in which the width of the first sealing part 510 is narrowed.

In addition, the first sealing part 510 and the third sealing part 530 may be arranged at different lengths inside the accommodating part.

In detail, the first length L1 of the first sealing part 510 disposed inside the accommodating part 320 may be smaller than the third length L3 of the third sealing part 530 disposed inside the accommodating part 320. Here, the first length and the third length may each be defined as a maximum length disposed inside the accommodating part 320.

A sealing material is introduced into the first sealing part 510 while the accommodating part 320 is filled with a light conversion material 330. Accordingly, the space where the fluid light conversion material 330 can enter the accommodating part is small. In addition, when the light conversion material and the sealing material come into contact, the light conversion material may push the sealing material outward.

On the other hand, a sealing material is introduced into the third sealing part 530 before the light conversion material 330 is filled within the accommodating part 320. Accordingly, the fluid sealing material can move toward the inside of the accommodating part through the cutting region. That is, the sealing material is introduced into the accommodating part 320 while the accommodating part 320 is empty. Accordingly, the sealing material can be introduced in a sufficient amount.

As a result, the length L1 of the first sealing part 510 may be smaller than the length L3 of the third sealing part 530.

An air gap region (AG) may be formed outside the third sealing part 530. That is, an air gap region AG may be formed on a surface opposite to one surface of the third sealing part 530 that contacts the light conversion material 300.

That is, the third sealing part 530 is first cured and then the light conversion material 330 is disposed. Accordingly, the light conversion material 300 may not be disposed in the outer region of the third sealing part 530.

Accordingly, it is possible to inhibit unnecessary light conversion material from being disposed on the outside of the third sealing part 530, which is the bezel region.

Figure 18:
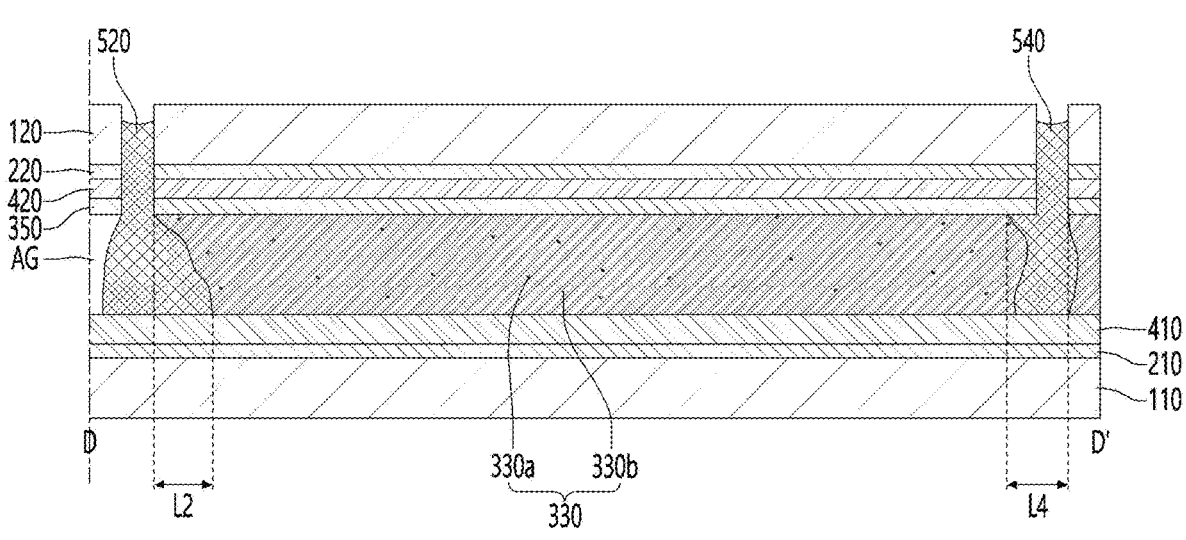
FIG. 18 is a cross-sectional view taken along a I-I' of FIG. 16.

Referring to FIGS. 16 and 18, the accommodating part 320 may be sealed by a second sealing part 520 and a fourth sealing part 540.

The second sealing part 520 may be cured before the light conversion material 330 is filled into the accommodating part 320. In addition, the fourth sealing part 540 may be cured after the light conversion material 330 is filled in the accommodating part 320.

Accordingly, the second sealing part 520 and the fourth sealing part 540 may be arranged in different shapes.

The fourth sealing part 540 may include a region where the width of the fourth sealing part 540 is narrowed. In detail, the fourth sealing part 540 may include a region in which a width of the fourth sealing part 540 becomes narrow while extending from the second substrate 120 toward the first substrate 110.

The sealing material is introduced into the fourth sealing part 540 in a state in which the light conversion material 330 is filled in the accommodating part 320. Accordingly, a space in which a light conversion material 330 having fluidity can enter the accommodating part is small. Also, when the light conversion material and the sealing material are in contact with each other, the light conversion material may push the sealing material outwards. Accordingly, a region in which a width of the fourth sealing part 540 becomes narrow after the sealing material is cured may be formed.

Therefore, the fourth sealing part 540 may include a region that narrows the width while extending from the second substrate 120 to the first substrate 110 and/or a region that narrows and then widens.

The second sealing part 520 may include a region in which a width of the second sealing part 520 is increased. In detail, the second sealing part 520 may include a region in which a width of the second sealing part 520 is increased while extending from the second substrate 120 toward the first substrate 110.

The sealing material is introduced into the second sealing part 520 before the light conversion material 330 is filled in the accommodating part 320. Accordingly, the sealing material having fluidity introduced through the cutting region may move toward the inside of the accommodating part. Accordingly, the second sealing part 520 may have a region whose width is widened after the sealing material is cured. For example, the second sealing part 520 may be formed to gradually widen the width from the second substrate 120 to the first substrate 110 after the sealing material is cured.

In addition, the second sealing part 520 may also include a region whose width is narrowed. At this time, the length of the region where the width of the second sealing part 520 is narrowed may be smaller than the length of the region where the width of the fourth sealing part 540 is narrowed.

In addition, the second sealing part 520 and the fourth sealing part 540 may be arranged at different lengths inside the accommodating part.

In detail, the second length L2 of the second sealing part 520 disposed inside the accommodating part 320 can be greater than the fourth length L3 of the fourth sealing part

540 disposed inside the accommodating part 320. Here, the second length and the fourth length may each be defined as a maximum length disposed inside the accommodating part 320.

A sealing material is introduced into the fourth sealing part 540 while the accommodating part 320 is filled with a light conversion material 330. Accordingly, the space where the fluid light conversion material 330 can enter the accommodating part is small. In addition, when the light conversion material and the sealing material come into contact, the light conversion material may push the sealing material outward.

On the other hand, the sealing material is introduced into the second sealing part 520 before the light conversion material 330 is filled inside the accommodating part 320. Accordingly, the fluid sealing material can move toward the inside of the accommodating part through the cutting region. That is, the sealing material is introduced into the accommodating part 320 while the accommodating part 320 is empty. Accordingly, the sealing material can be introduced in a sufficient amount.

Accordingly, the second length L2 of the second sealing part 520 may be greater than the fourth length L4 of the fourth sealing part 540.

An air gap region (AG) may be formed outside the fourth sealing part 540. That is, an air gap region AG may be formed on a surface opposite to one surface of the fourth sealing part 530 that contacts the light conversion material 300.

That is, the fourth sealing part 540 is first cured and then the light conversion material 330 is disposed. Accordingly, the light conversion material 300 may not be disposed in the outer region of the fourth sealing part 540.

Accordingly, it is possible to inhibit unnecessary light conversion material from being placed on the outside of the fourth sealing part 540, which is the bezel region.

The optical path control member according to embodiments may harden the sealing part before injecting the light conversion material into regions other than the region into which the light conversion material is injected.

That is, except for the first sealing part and the fourth sealing part into which the light conversion material is injected, the second sealing part and the third sealing part may harden the sealing material before injecting the light conversion material.

Accordingly, the light conversion material is injected into the second sealing part and the third sealing part after curing. Accordingly, the second sealing part and the third sealing part have improved curing properties. Accordingly, it can have improved sealing properties.

In addition, the second sealing part and the third sealing part are not mixed with light conversion material, etc. during the curing process. Accordingly, staining due to this can be inhibited. Thereby, user visibility can be improved.

In addition, in the first sealing part, a light conversion material is injected and then the sealing material is cured. However, the width of the first sealing part is smaller than the widths of the other sealing parts, it is possible to minimize the recognition of stains from the outside.

In addition, the fourth sealing part hardens the sealing material after injecting the light conversion material. However, the light conversion material can also be injected through the fourth sealing part. Accordingly, the tilting angle of the accommodating part can be set to various size ranges.

Hereinafter, a display device and a display device to which an optical path control member according to an embodiment is applied will be described with reference to FIGS. 19 to 23.

Figure 19:
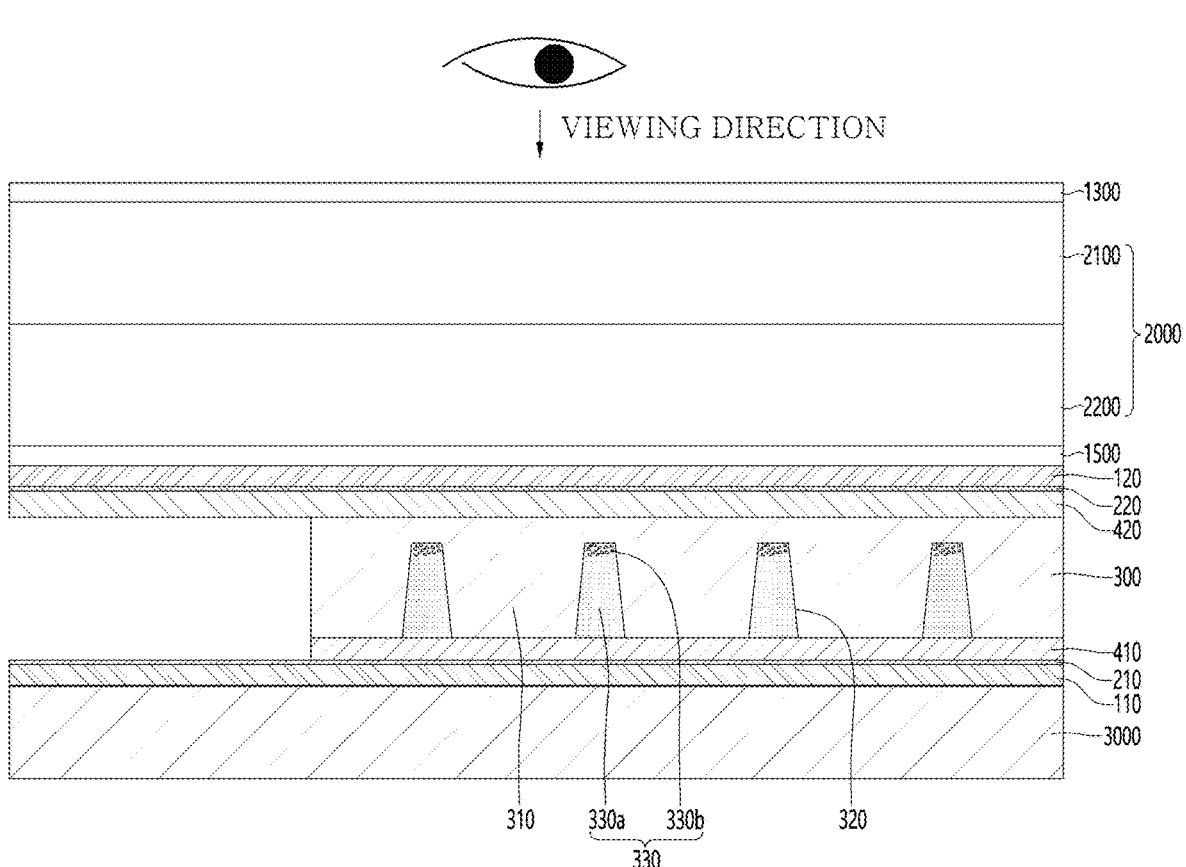
FIGS. 19 and 20 are cross-sectional views of a display device to which an optical path control member according to an embodiment is applied.
Figure 20:
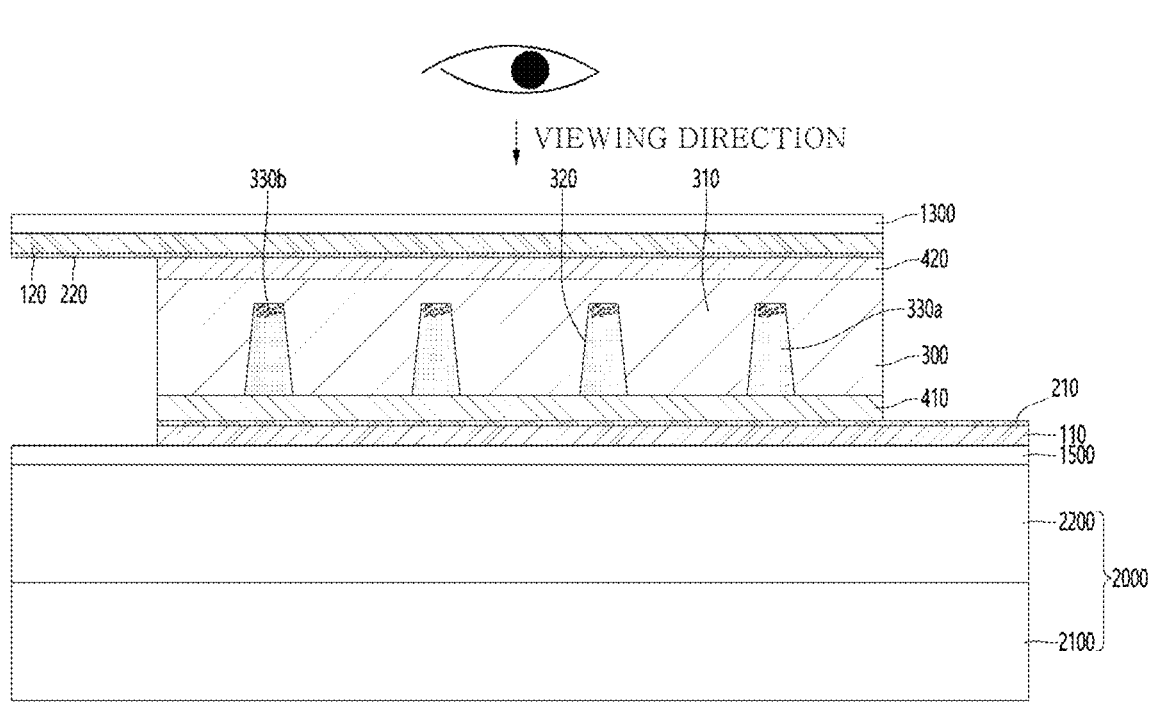

Referring to FIGS. 19 and 20, the optical path control member 1000 according to the embodiment may be disposed on or below the display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

The display panel 2000 may include a first base substrate 2100 and a second base substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first base substrate 2100 including a thin film transistor (TFT) and a pixel electrode and the second base substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base substrate 2100 and the second base substrate 2200 is bonded to the first base substrate 2100 with the liquid crystal layer interposed therebetween. That is, a thin film transistor may be formed on the first base substrate 2100, a protective film may be formed on the thin film transistor, and a color filter layer may be formed on the protective film. In addition, a pixel electrode in contact with the thin film transistor may be formed on the first base substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 19, the optical path control member may be disposed under the liquid crystal panel and on the backlight unit 3000, and the optical path control member may be disposed between the backlight unit 3000 and the display panel 2000.

Alternatively, as shown in FIG. 20, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first base substrate 2100, and an organic light emitting element in contact with the thin film transistor may be formed. The organic light emitting element may include an anode, a cathode, and an organic light emitting layer formed between the anode and the cathode. In addition, the second base substrate 2200 configured to function as an encapsulation substrate for encapsulation may be further included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion unit of the optical path control member according to the embodiment is in a direction parallel or perpendicular to an outer surface of the second substrate, but the light conversion unit is formed to be inclined at a predetermined angle from the outer surface of the second substrate. Through this, a moiré phenomenon occurring between the display panel and the optical path control member may be reduced.

Figure 21:
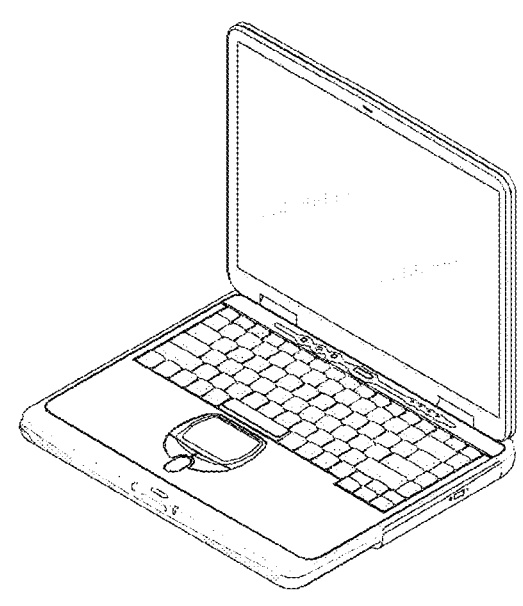

Referring to FIGS. 21 to 22, an optical path control member according to an embodiment may be applied to various display devices.

For example, when power is applied to the optical path control member as shown in FIG. 21, the accommodating part functions as the light transmitting part, so that the display device may be driven in the public mode, and when power is not applied to the optical path control member as shown in FIG. 22, the accommodating part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

Figure 23:
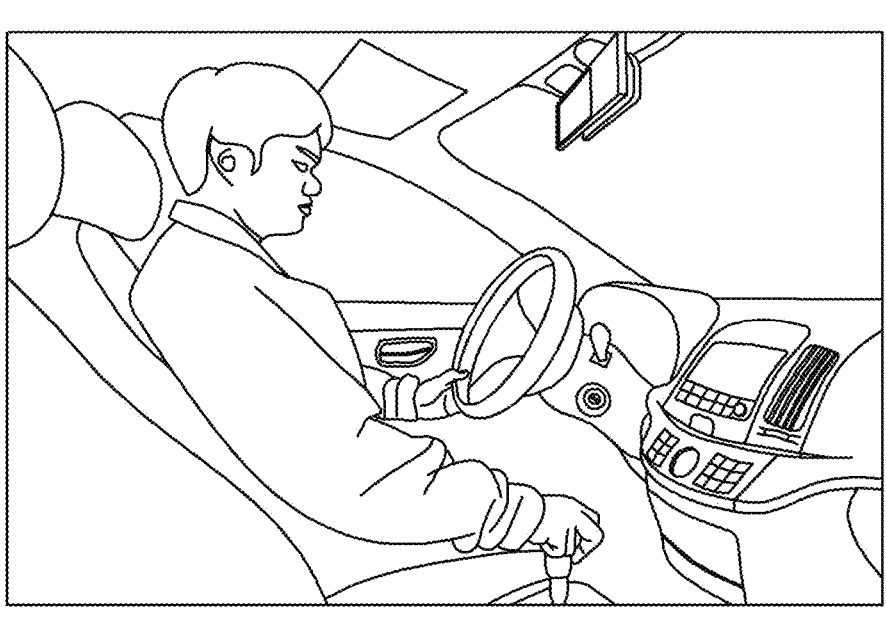

In addition, referring to FIG. 23, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle. When the optical path control member is used in the dashboard of the vehicle, an external shape of the optical path control member may vary depending on a shape of the dashboard, which is not rectangular.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
a first substrate;
a first electrode disposed on the first substrate;
a second electrode disposed on the first substrate;
a second substrate disposed on the second electrode;

a light conversion unit disposed between the first electrode and the second electrode and including a plurality of accommodating parts in which a light conversion material is disposed; and
a first sealing part and a second sealing part formed in a cutting region formed by cutting the second substrate, the second electrode, and the light conversion unit,
wherein the first sealing part and the second sealing part are extended in a first direction, respectively, and are spaced apart from each other in a second direction perpendicular to the first direction,
wherein the first sealing part and the second sealing part include a sealing region disposed inside the cutting region and an anchor region disposed inside the accommodating part, respectively,
wherein a size of the anchor region of the first sealing part is greater than a size of the anchor region of the second sealing part, and
wherein a length of the first sealing part in the first direction is different from a length of the second sealing part in the first direction.

2. The optical path control member of claim 1, wherein the anchor region of the first sealing part and the anchor region of the second sealing part each has a length of 100 μm to 800 μm.

3. The optical path control member of claim 2, wherein a width of the first sealing part is smaller than widths of the second sealing part, the third sealing part, and the fourth sealing part.

4. The optical path control member of claim 1, wherein a length of the anchor region of the first sealing part is 500 μm to 700 μm, and
wherein a length of the anchor region of the second sealing part is 50 μm to 400 μm.

5. The optical path control member of claim 1, wherein a difference between a length of the anchor region of the first sealing part and a length of the anchor region of the second sealing part is 100 μm to 300 μm.

6. The optical path control member of claim 1, wherein the light conversion material is injected in a direction from the cutting region in which the first sealing part is disposed toward the cutting region in which the second sealing part is disposed.

7. The optical path control member of claim 1, comprising:
a third sealing part and a fourth sealing part formed in a cutting region formed by cutting the second substrate, the second electrode, and the light conversion unit and disposed to extend in the second direction and spaced apart from each other in the first direction, and
wherein at least one of the third sealing part and the fourth sealing part includes a sealing region disposed inside the cutting region and an anchor region disposed inside the accommodating part.

8. The optical path control member of claim 7, wherein the plurality of accommodating parts include:
a first accommodating part contacting the first sealing part and the second sealing part, a second accommodating part contacting the first sealing part and the fourth sealing part, and a third accommodating part contacting the second sealing part and the third sealing part,
wherein the first to third accommodating parts are disposed to extend in a third direction between the first direction and the second direction, and
wherein a size of the anchor region of the first sealing part is greater than a size of the anchor region of the fourth sealing part.

9. The optical path control member of claim 7, wherein the plurality of accommodating parts include:

a first accommodating part contacting the first sealing part and the second sealing part, a second accommodating part contacting the first sealing part and the third sealing part, and a third accommodating part contacting the second sealing part and the fourth sealing part, wherein the first to third accommodating parts are disposed to extend in a third direction between the first direction and the second direction, and wherein a size of the anchor region of the first sealing part is greater than a size of the anchor region of the third sealing part.

10. The optical path control member of claim 7, wherein the second sealing part does not contact the fourth sealing part.

11. The optical path control member of claim 7, wherein a concave portion is provided at an upper surface of at least one of the first to fourth sealing parts.

12. The optical path control member of claim 7, wherein at least one of the first sealing part, the second sealing part, the third sealing part, and the fourth sealing part includes a region whose width is narrowed while extending from the second substrate toward the first substrate.

13. The optical path control member of claim 12, wherein the light conversion unit includes a plurality of partition wall parts provided between the plurality of accommodating parts, and wherein first and second ends of the first accommodating part are in contact with the first sealing part and the second sealing part, respectively.

14. The optical path control member of claim 1, wherein the first sealing part includes a first outer surface overlapping the second substrate, the second electrode, and the light conversion unit along the second direction, and wherein the first outer surface is positioned on a same vertical line.

15. The optical path control member of claim 14, wherein the second substrate includes a first side end positioned closest to the first outer surface, and wherein the first outer surface is provided further outside the first side end with respect to the second direction.

16. A display device comprising:

a panel including at least one of a display panel and a touch panel; and the optical path control member of claim 1 disposed on or under the panel.

* * * * *